(12) United States Patent
Fujiwara et al.

(10) Patent No.: US 7,787,735 B2
(45) Date of Patent: Aug. 31, 2010

(54) WAVEGUIDE STRUCTURE AND OPTICAL DEVICE

(75) Inventors: Hiroyasu Fujiwara, Hamamatsu (JP); Masamichi Yamanishi, Hamamatsu (JP); Akira Higuchi, Hamamatsu (JP); Kazutoshi Nakajima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 364 days.

(21) Appl. No.: 11/822,542

(22) Filed: Jul. 6, 2007

(65) Prior Publication Data

US 2008/0013878 A1 Jan. 17, 2008

(30) Foreign Application Priority Data

Jul. 13, 2006 (JP) ............................ P2006-193023

(51) Int. Cl.
*G02B 6/10* (2006.01)
(52) U.S. Cl. ........................................ 385/131; 385/27
(58) Field of Classification Search ........................ None
See application file for complete search history.

(56) References Cited

FOREIGN PATENT DOCUMENTS

JP 2004-213000 7/2004
WO WO 2004034533 A1 * 4/2004

OTHER PUBLICATIONS

T. Ishi, et al. "Si Nano-Photodiode With a Surface Plasmon Antenna." *Japanese Journal of Applied Science*, vol. 44, No. 12, 2005, pp. L364-L366.

* cited by examiner

*Primary Examiner*—Sarah Song
(74) *Attorney, Agent, or Firm*—Drinker Biddle & Reath LLP

(57) ABSTRACT

There is disclosed a waveguide structure that propagates surface plasmon waves, comprising: a quantum well structure, disposed on a semiconductor substrate; wherein the quantum well structure has a quantum well layer, in turn having an intersecting region that intersects a hypothetical plane substantially orthogonal to an alignment direction of the quantum well structure with respect to the semiconductor substrate, and a real part of a dielectric constant of the quantum well structure is negative for THz waves of a predetermined wavelength.

14 Claims, 27 Drawing Sheets

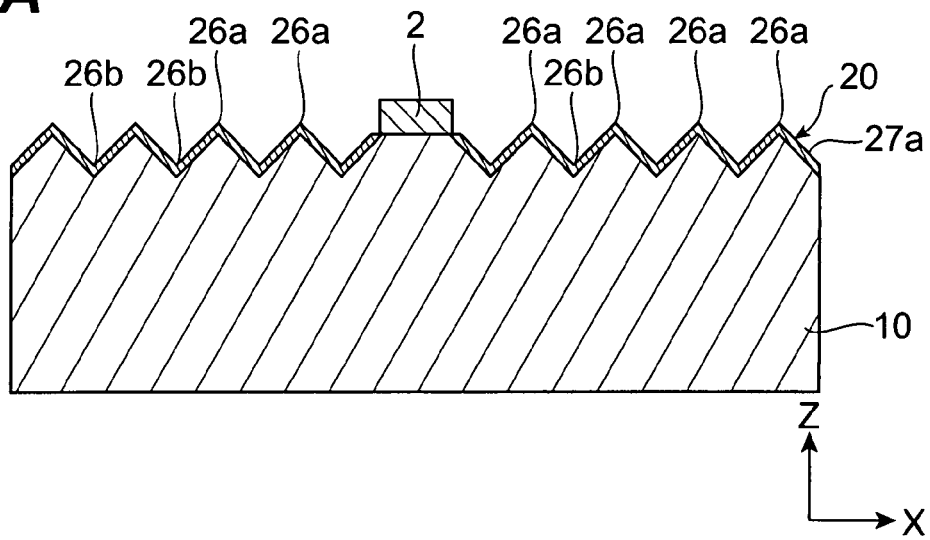
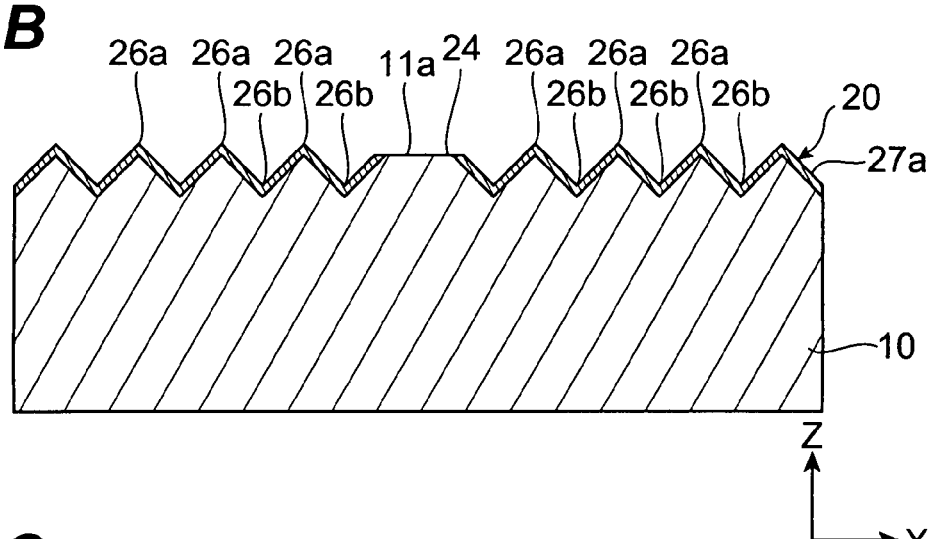
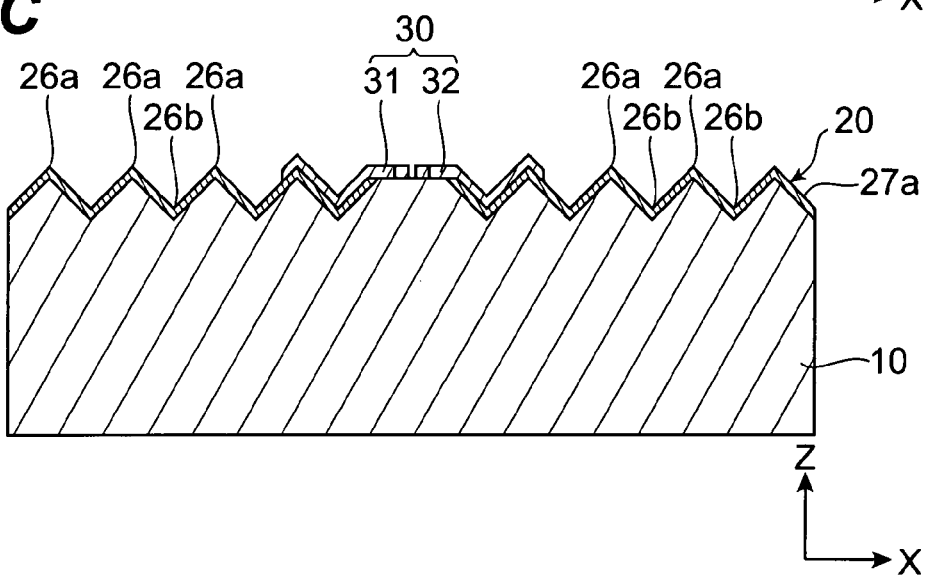

WAVEGUIDE STRUCTURE AND OPTICAL DEVICE

BACKGROUND OF THE INVENTION

1. Field of the Invention

The present invention relates to a waveguide structure and an optical device that propagate surface plasmon waves.

2. Related Background Art

In the present technical field, focusing mechanisms, such as that described in Tsutomi Ishi, et al., "Si Nano-Photodiode with a Surface Plasmon Antenna," Japanese Journal of Applied Physics, 2005, Vol. 44, No. 12, pp. L364-L366 and making use of surface plasmons, have been known from before. With the art described in Tsutomi Ishi, et al., "Si Nano-Photodiode with a Surface Plasmon Antenna," Japanese Journal of Applied Physics, 2005, Vol. 44, No. 12, pp. L364-L366, a metal film, having one or more apertures and having a periodically varying surface, is disposed on a Si mesa structure. Of light made incident on the metal film, only wavelength components in a specific relationship with the period formed on the metal film are reinforced and transmitted to the Si mesa structure side of the apertures. This occurs due to the light energy illuminated on the metal film outside the apertures being concentrated toward the apertures via surface plasmon propagation.

As another known art of the present technical field, Japanese Published Unexamined Patent Application No. 2004-213000 describes propagation of surface plasmons using a conductive film, formed of gold, etc., with a periodic surface shape and having apertures of a size no more than a wavelength.

SUMMARY OF THE INVENTION

FIG. 4 is a conceptual diagram of a surface plasmon wave. The surface plasmon wave (propagated in direction 100) is a wave that propagates along an interface of a dielectric 110, having a positive dielectric constant, and a conductive substance 111, having a dielectric constant with a negative real part, and the amplitude direction of the surface plasmon wave is a direction that is substantially orthogonal to the interface. Here, the dielectric constant of the dielectric 110 shall be deemed to be $\in_d$ and the dielectric constant of the conductive substance 111 shall be deemed to be $\in_m$. Because an imaginary part is present in the dielectric constant of a normal conductive substance, $\in_m$ can be expressed as: $\in_m = \in_{mr} + i\in_{mi}$. As indicated in Tsutomi Ishi, et al., "Si Nano-Photodiode with a Surface Plasmon Antenna," Japanese Journal of Applied Physics, 2005, Vol. 44, No. 12, pp. L364-L366, metals (such as gold and silver) are known as examples of the conductive substance 111 with which $\in_m$ is negative for light in the visible range.

However, because the dielectric constant $\in_m$ of the conductive substance 111 has the imaginary part $\in_{mi}$ as described above, the surface plasmon wave (propagated in direction 100) becomes attenuated as it propagates. The arts described in Tsutomi Ishi, et al., "Si Nano-Photodiode with a Surface Plasmon Antenna," Japanese Journal of Applied Physics, 2005, Vol. 44, No. 12, pp. L364-L366 and Japanese Published Unexamined Patent Application No. 2004-213000 thus have a problem that a propagation distance L of the surface plasmon wave (propagated in direction 100) is short. Also particularly with the art described in Tsutomi Ishi, et al., "Si Nano-Photodiode with a Surface Plasmon Antenna," Japanese Journal of Applied Physics, 2005, Vol. 44, No. 12, pp. L364-L366, because a metal is used, processing is difficult and as a result, manufacturing is difficult.

Thus an object of the present invention is to provide a waveguide structure and an optical device that can be manufactured easily and are longer in the propagation distance of surface plasmon waves.

A waveguide structure according to the present invention is a waveguide structure that propagates surface plasmon waves, includes: a quantum well structure, disposed on a semiconductor substrate; and is characterized in that the quantum well structure has a quantum well layer, in turn having an intersecting region that intersects a hypothetical plane substantially orthogonal to an alignment direction of the quantum well structure with respect to the semiconductor substrate, and a real part of a dielectric constant of the quantum well structure is negative for THz waves of a predetermined wavelength.

Because with a semiconductor, the real part of the dielectric constant can be made negative for light in the THz range (hereinafter at times referred to as "THz waves") by adjustment of a carrier concentration, surface plasmon waves can be propagated using a semiconductor. Although a high carrier mobility is required to make the propagation distance of surface plasmon waves long, with a bulk semiconductor, the carrier mobility tends to decrease as the carrier concentration increases.

Meanwhile, with the above-described waveguide structure, a quantum well structure, with which the real part of the dielectric constant is negative with respect to THz waves of a predetermined wavelength, is employed. Because in the quantum well structure, an impurity and a carrier movement space are separated spatially, even if the impurity amount is made high, the carrier mobility can be kept high. Also, because the intersecting region in the quantum well layer of the quantum well structure intersects the hypothetical plane substantially orthogonal to the alignment direction of the quantum well structure with respect to the semiconductor substrate, a component that is matched in oscillation direction with the surface plasmon waves is always present in electron oscillations inside the intersecting region. Thus with the present waveguide structure, the intersecting region can be used to excite surface plasmon waves efficiently and propagate the surface plasmon waves over a longer distance. Also because a quantum well structure is used, processing is easy and as a result, manufacture of the waveguide structure is easy.

Further, the optical device according to the present invention includes: a semiconductor substrate and a waveguide, disposed on the semiconductor substrate and having the waveguide structure according to the present invention; and is characterized in that the waveguide has a focusing portion for focusing the surface plasmon waves, the focusing portion being disposed along a direction of propagation of the surface plasmon waves propagated by the waveguide structure.

With the optical device of the above arrangement, because the focusing portion is disposed along the direction of propagation of the surface plasmon waves propagating in the waveguide structure, the surface plasmon waves that are propagated by the waveguide structure are focused to the focusing portion. Although surface plasmon waves are known to propagate while becoming attenuated, with the waveguide structure according to the present invention, the propagation distance of surface plasmon waves is made long as described above. Consequently with the above-described optical device, the efficiency of focusing of the surface plasmon waves to the focusing portion is made high. Also because a quantum well structure is used, processing is easy and as a result, manufacture of the optical device is easy.

Preferably the focusing portion is an aperture that penetrates through the waveguide in the alignment direction of the quantum well structure with respect to the semiconductor substrate.

Also preferably, the optical device furthermore includes: a surface plasmon wave generating portion, making surface plasmon waves be generated according to incidence of the THz waves of the predetermined wavelength; and the surface plasmon waves generated by the surface plasmon wave generating portion are made to propagate through the waveguide structure.

In this case, the surface plasmon waves generated by the surface plasmon wave generating portion can be propagated through the waveguide structure and focused to the focusing portion.

Furthermore, with the optical device, the surface plasmon wave generating portion is preferably a periodic uneven pattern that is formed in the quantum well structure provided in the waveguide structure.

In this case, because an uneven pattern is formed in the quantum well structure, the quantum well layer, included in the quantum well structure, also has the same uneven pattern. The quantum well layer thus has a plurality of, intersecting regions. The surface plasmon waves, generated upon incidence of the THz waves of the predetermined wavelength onto the uneven pattern, which is formed in the quantum well structure as the surface plasmon wave generating portion, can thereby be propagated and focused to the focusing portion using the respective intersecting regions inside the quantum well structure.

Because the surface plasmon waves are thus generated from the THz waves of the predetermined wavelength by using the surface plasmon wave generating portion, for example, the optical device can be used as a spectroscopic element that spectrally separates THz waves of a predetermined wavelength component from among THz waves or as a light receiving element that detects THz waves of a predetermined wavelength component from among THz waves. Also by outputting the surface plasmon waves focused to the focusing portion upon reconversion to THz waves with the same oscillation frequency as the surface plasmon waves, the optical device can be used as a light emitting element.

Furthermore, preferably with the optical device, with which the abovedescribed periodic uneven pattern is formed in the quantum well structure, the quantum well layer of the quantum well structure has a plurality of intersecting regions, and the plurality of intersecting regions are continuous in the form of the uneven pattern. In this case, because the plurality of intersecting regions are continuous in the form of the uneven pattern, the surface plasmon waves generated at the uneven pattern, which is the surface plasmon wave generating portion, are propagated in the alignment direction of the plurality of intersecting regions and focused to the focusing portion.

Further, preferably with the optical device, an uneven pattern is formed in the quantum well structure provided in the waveguide structure, the quantum well layer of the quantum well structure has a plurality of intersecting regions, the plurality of intersecting regions are continuous in the form of the uneven pattern, the uneven pattern includes a first uneven pattern, having a first period, and a second uneven pattern, having a second period and being positioned, with respect to the first uneven pattern, in a direction substantially orthogonal to the alignment direction, the first uneven pattern is the surface plasmon wave generating portion, the second uneven pattern is positioned at a side opposite the focusing portion with respect to the first uneven pattern, and the second period is half of the first period.

With this arrangement, because the first uneven pattern functions as the surface plasmon generating portion, when the THz waves of the predetermined wavelength are made incident into the optical device, surface plasmon waves are generated by the first uneven pattern. Because the quantum well layer that constitutes a portion of the quantum well structure has the plurality of intersecting regions that are continuous in the form of the uneven pattern, the surface plasmon waves, generated at the first uneven pattern, are propagated by the plurality of intersecting regions in the direction in which the intersecting regions are continuous. Because the focusing portion is disposed along the propagation direction of the surface plasmon waves, the surface plasmon waves, among the surface plasmon waves generated at the first uneven pattern, that propagate to the focusing portions side are focused to the focusing portion as described above. A portion of the surface plasmon waves may propagate to a side opposite the focusing portion side. With the present optical device, the second uneven pattern is disposed at the side opposite the focusing portion with respect to the first uneven pattern and the second period is half the first period. The surface plasmon waves propagating to the second uneven pattern side are thus reflected by the second uneven pattern and then propagate to the focusing portion side and focused to the focusing portion. As a result, the focusing efficiency of the surface plasmon waves can be improved further.

Further, preferably with the optical device, the surface plasmon wave generating portion is an uneven pattern, formed on a principal surface of the semiconductor substrate and causing the surface plasmon waves to be generated upon incidence of the THz waves of the predetermined wavelength, and the waveguide is disposed on the principal surface on which the uneven pattern is formed.

In this case, the surface plasmon waves, generated by the incidence of the THz waves of the predetermined wavelength onto the uneven pattern formed on the principal surface of the semiconductor substrate, are made to propagate and be focused to the focusing portion by the intersecting regions of the waveguide disposed on the principal surface. Because the surface plasmon wave generating portion is thus used to generate the surface plasmon waves in accordance with the THz waves of the predetermined wavelength and focus the surface plasmon waves, the optical device can be used, for example, as a spectroscopic element that spectrally separates THz waves of a predetermined wavelength component from among THz waves or as a light receiving element that detects THz waves of a predetermined wavelength component from among THz waves. Also by outputting the surface plasmon waves focused to the focusing portion upon reconversion into THz waves with the same oscillation frequency as the surface plasmon waves, the optical device can be used as a light emitting element.

Preferably with the optical device, a wave receiving portion that detects the surface plasmon waves propagating through the waveguide structure or THz waves, having the same oscillation frequency as the surface plasmon waves, is disposed on the focusing portion.

With this arrangement, the surface plasmon waves generated at the surface plasmon wave generating portion are focused to the focusing portion via the intersecting regions and the focused surface plasmon waves or the THz waves having the same oscillation frequency as the surface plasmon waves are detected by the wave receiving portion. That is, the optical device having the wave receiving portion functions as a THz wave detecting device that detects THz waves of the predetermined wavelength. Because the surface plasmon waves can be propagated over a longer distance at the intersecting regions, the efficiency of focusing of the surface plasmon waves to the focusing portion is high. THz waves of the predetermined wavelength can thus be detected efficiently.

Further, preferably with the optical device, a plurality of focusing portions are provided, and the wave receiving portion is disposed on each of the focusing portions. With this arrangement, because each of the focusing portions is provided with the wave receiving portion and surface plasmon waves or THz waves, having the same oscillation frequency as the surface plasmon waves, can be detected by the respective wave receiving portions, for example, when the THz waves of the predetermined wavelength that are made incident on the optical device have a spatial distribution, detection that reflects the spatial distribution is enabled. A spatial image of THz waves can thus be detected.

Further, preferably with the optical device, a THz wave generating portion, generating the THz waves of the predetermined wavelength, is disposed on the focusing portion, and the surface plasmon wave generating portion generates the surface plasmon waves according to incidence of the THz waves of the predetermined wavelength generated by the THz wave generating portion.

With this arrangement, surface plasmon waves are generated by the THz waves, having the predetermined wavelength and generated by the THz wave generating portion, being made incident on the surface plasmon wave generating portion, and the generated surface plasmon waves are made to propagate through the intersecting regions, focused to the focusing region, and converted into THz waves, which have the same oscillation frequency as the surface plasmon waves and are output to the exterior of the optical device. The optical device with the THz light emitting portion thus functions as a THz wave generating element. Because the surface plasmon waves can be propagated over a longer distance at the intersecting regions, the efficiency of focusing of the surface plasmon waves to the focusing portion is high. THz waves of higher energy density can thus be generated.

Further, preferably with the optical device, a plurality of focusing portions are provided and the THz wave generating portion is disposed on each of the focusing portions.

In this case, because THz waves are output from the optical device in accordance with the THz waves output from the THz wave generating portions disposed on the respective focusing portions, for example, by controlling the generation of the THz waves from the THz wave generating portions, control of a spatial image (spatial pattern) of the THz waves output from the optical device is enabled.

Further, preferably with the optical device according to the present invention includes (1) a semiconductor substrate and (2) a plurality of waveguides, disposed on the semiconductor substrate and each of the waveguides having the waveguide structure according to the present invention; and is characterized in that (3) the waveguides are aligned in parallel in a direction substantially orthogonal to the alignment direction, and (4) in each of the waveguides, a (i) periodic uneven pattern, causing surface plasmon waves to be generated according to incidence of THz waves of a predetermined wavelength, is formed in the quantum well structure provided in the waveguide structure, (ii) the quantum well layer has a plurality of intersecting regions that are continuous in the form of the uneven pattern, and (iii) focusing portion, focusing the surface plasmon waves, is disposed along the direction of propagation of the surface plasmon waves propagated by the waveguide structure, and (5) the periods of the uneven patterns in the waveguide structures of at least two of the waveguides, among the plurality of waveguides, differ.

With this arrangement, when THz waves of a wavelength, which causes the uneven pattern of a waveguide to generate surface plasmon waves, are made incident on the uneven pattern, the generated surface plasmon waves are focused to the focusing portion upon propagating through the plurality of intersecting regions. Thus in a case where the incident THz waves have a plurality of wavelength components, a wavelength can be selected by conversion into surface plasmon waves according to the period of the uneven pattern. Because with the above optical device, the periods of the uneven patterns of at least two of the waveguides differ, at least two wavelength components can be selected from among the wavelength components of the incident THz waves. The optical device can thus be used, for example, as a spectroscopic device.

Further, preferably with the optical device, a wave receiving portion that detects the surface plasmon waves propagating through the waveguide structure or THz waves, having the same oscillation frequency as the surface plasmon waves, is disposed on the focusing portion of each of the waveguides.

In this case, because the surface plasmon waves focused to the respective focusing portions or THz waves, having the same oscillation frequency as the surface plasmon waves, can be detected by the wave receiving portions, at least two wavelength components can be detected selectively from among the wavelength components of the THz waves made incident on the optical device.

Further, preferably with the optical device, on the focusing portion of each of the waveguides is disposed a THz generating portion that generates the THz waves of the predetermined wavelength that make the surface plasmon waves to be generated in the uneven pattern of each of the waveguides.

In this case, surface plasmon waves are generated by the uneven patterns of the respective waveguides in accordance with the THz waves output from the THz generating portions disposed on the respective focusing portions, focused to the focusing portions, and converted into THz waves, which have the same oscillation frequency as the surface plasmon waves and are output from the optical device. Because the periods of the uneven patterns included in two of the waveguides among the plurality of waveguides differ, the oscillation frequencies of the surface plasmon waves propagated through at least two uneven patterns differ. THz waves having at least two different wavelengths can thus be output from the optical device.

With the waveguide structure and the optical device according to the present invention, manufacture is easy and surface plasmon waves can be propagated over a longer distance.

BRIEF DESCRIPTION OF THE DRAWINGS

FIGS. 11A, 11B, and 11C are diagrams of steps in a process for manufacturing the optical device according to the first embodiment.

DESCRIPTION OF THE PREFERRED EMBODIMENTS

Figure 1:
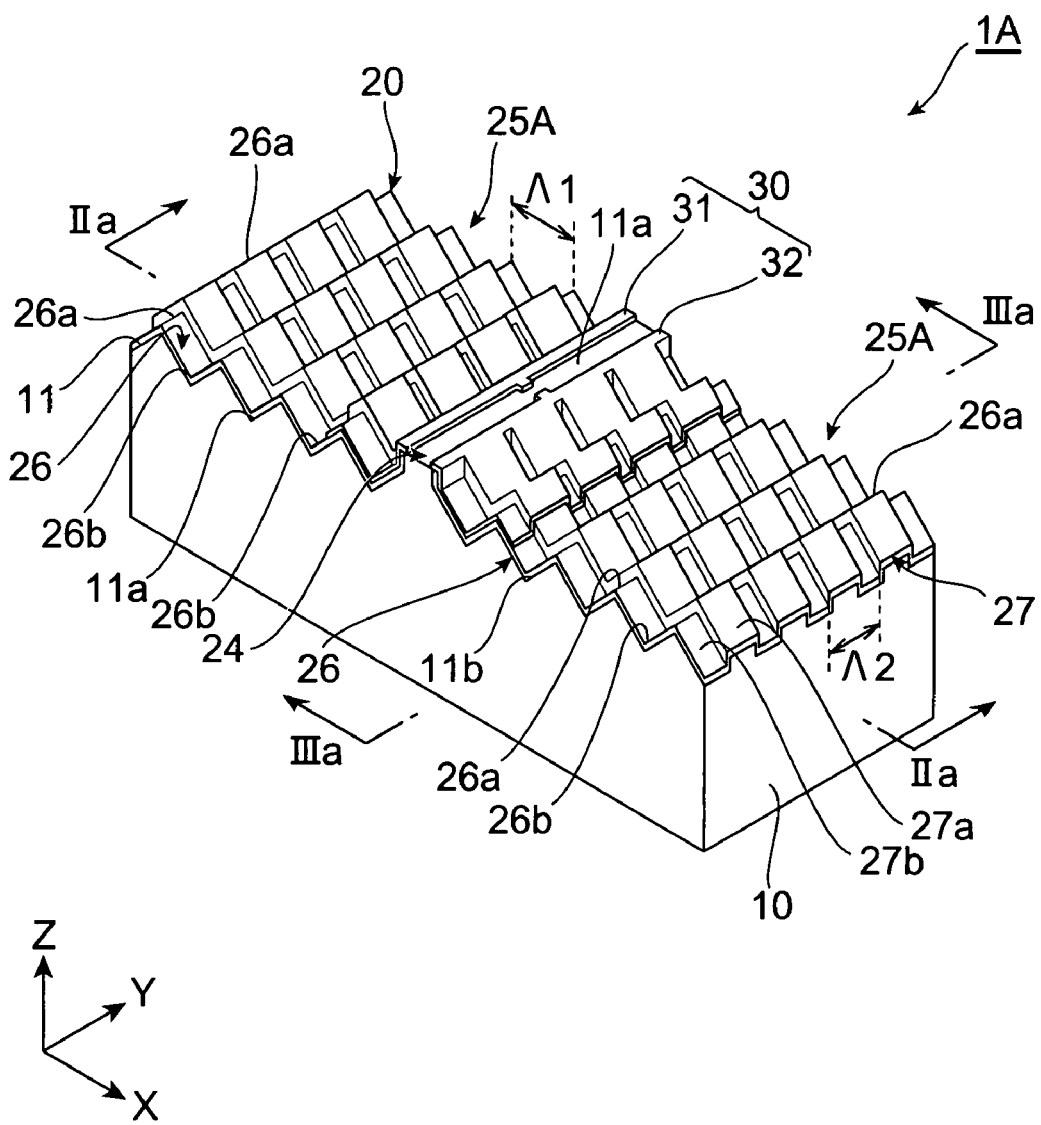
FIG. 1 is a perspective view of an embodiment of an optical device according to the present invention.

Embodiments of the waveguide structure and the optical device according to the present invention shall now be described with reference to the drawings. In the description of the drawings, elements that are the same shall be provided with the same symbol and redundant description shall be omitted. The dimensional proportions in the drawings do not necessarily match those of the description. In the present Specification, "upper," "lower," and other terms indicating directions are terms for the sake of convenience that are based on states illustrated in the drawings.

First Embodiment

Figure 2A:
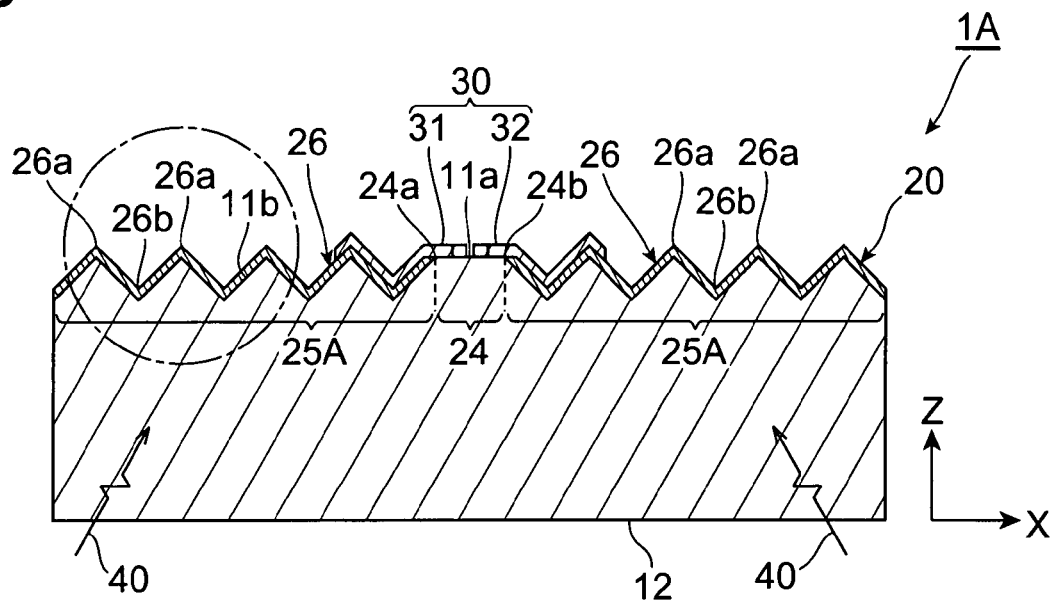
FIG. 2A shows a sectional view taken on line IIa-IIa of FIG. 1.
Figure 2B:
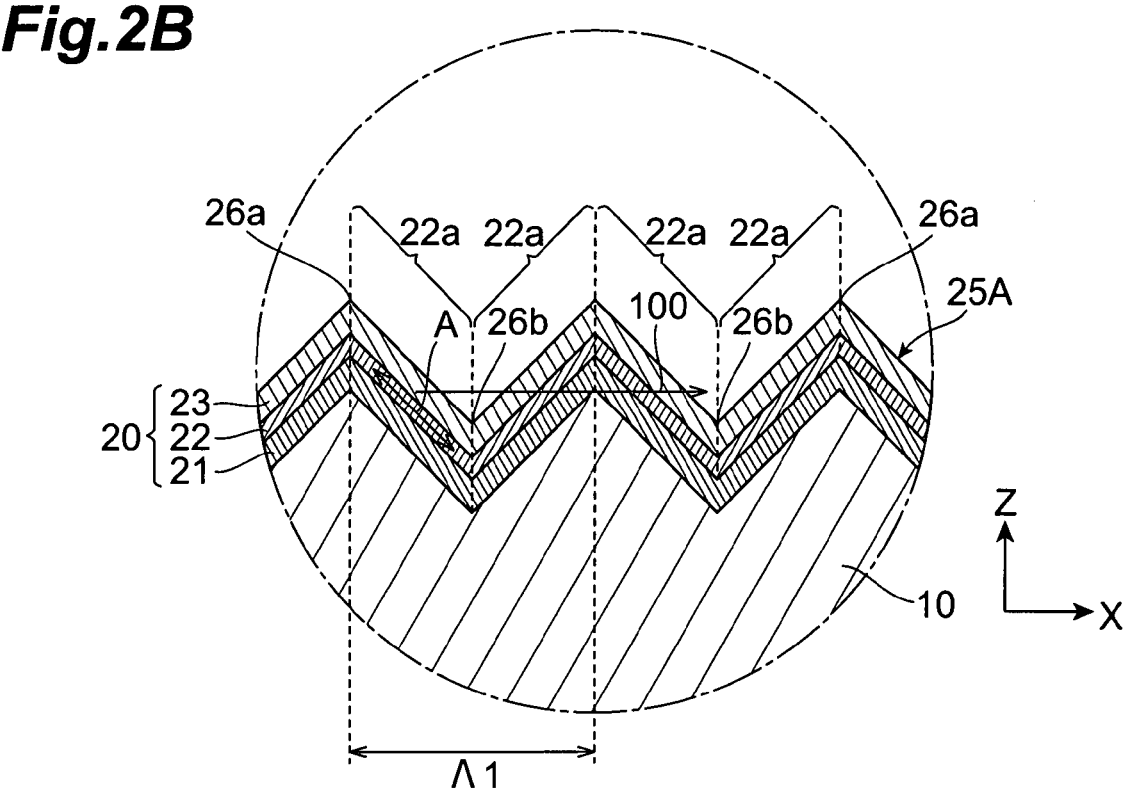
FIG. 2B shows a partially enlarged view of FIG. 2A.
Figure 3A:
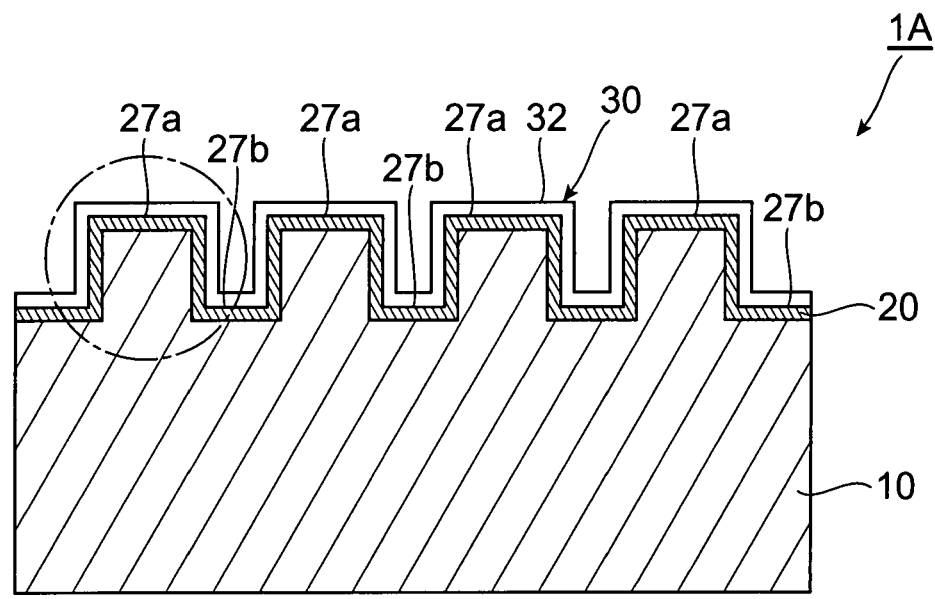
FIG. 3A shows a sectional view taken on line IIIa-IIIa of FIG. 1.
Figure 3B:
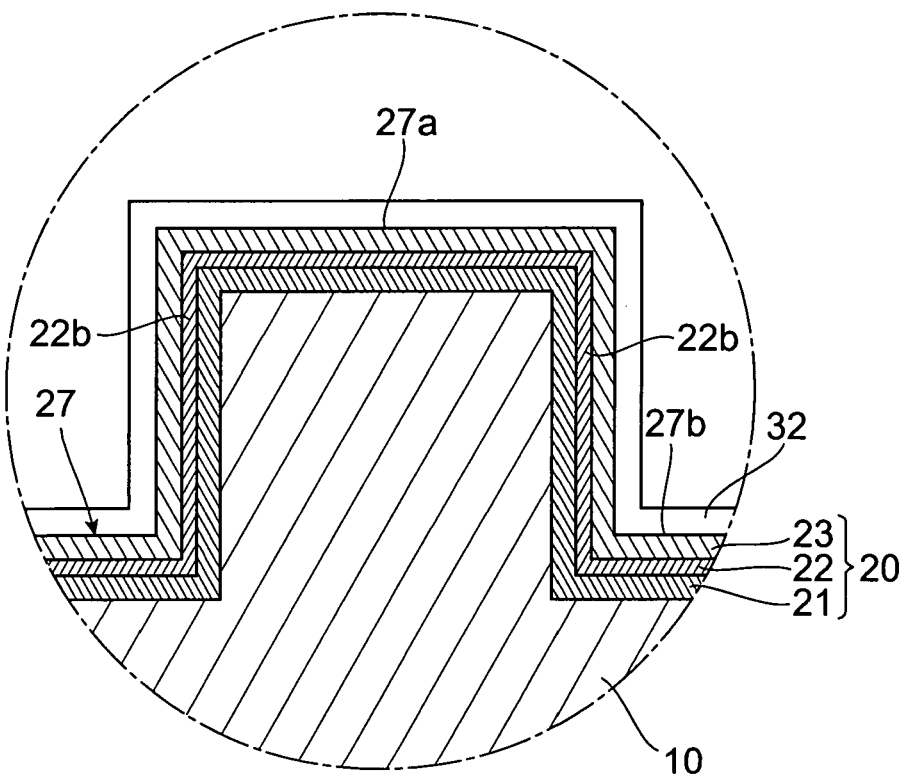
FIG. 3B shows a partially enlarged view of FIG. 3A.

FIG. 1 is a perspective view of an embodiment of an optical device according to the present invention. FIG. 2A shows a sectional view taken on line IIa-IIa of FIG. 1. FIG. 2B shows a partially enlarged view of FIG. 2A. FIG. 3A shows a sectional view taken on line IIIa-IIIa of FIG. 1. FIG. 3B shows a partially enlarged view of FIG. 3A. An embodiment of a waveguide structure according to the present invention is applied to the optical device 1A. The optical device 1A shown in FIG. 1 is a THz light receiving element for detecting THz waves, which are light components of wavelengths in a range of 30 μm to 1000 μm (or oscillation frequencies in a range of $1.9 \times 10^{12}$ to $6.3 \times 10^{13}$ (1/sec)).

The optical device 1A includes a semiconductor substrate 10, which can propagate THz waves and is formed, for example, of GaAs, and a layer-like waveguide 20 (waveguide structure, quantum well structure) is laminated on the semiconductor substrate 10. In the description that follows, a lamination direction (alignment direction) in which the waveguide 20 is laminated with respect to the semiconductor substrate 10 shall be deemed to be a Z-axis direction, and two directions substantially orthogonal to the Z-axis direction shall be deemed to be an X-axis direction and a Y-axis direction as shown in FIG. 1. Because a hypothetical plane that is substantially orthogonal to the Z-axis direction is a plane that is parallel to the XY plane, the hypothetical plane substantially orthogonal to the Z-axis direction shall be referred to as the "XY plane" for the sake of convenience. Likewise, a hypothetical plane substantially orthogonal to the Y-axis direction shall be referred to as the "XZ plane," and a hypothetical plane substantially orthogonal to the X-axis direction shall be referred to as the "YZ plane."

As shown in FIGS. 2B and 3B, the waveguide 20 is a quantum well structure that is formed by laminating a clad layer 21, a quantum well layer 22, and a clad layer 23 in that order on a top surface 11 (principal surface) of the semiconductor substrate 10. The waveguide 20 functions as a layer-like antenna that selectively receives THz waves of a predetermined wavelength. FIGS. 2B and 3B are partially enlarged views of regions surrounded by alternate long and short dash lines in FIGS. 2A and 3A.

The respective thicknesses of the clad layer 21, the quantum well layer 22, and the clad layer 23 are, for example, 100 nm, 10 nm, and 500 nm. For example, when the semiconductor substrate 10 is formed of GaAs as described above the clad layers 21 and 23 may be formed of n-type or p-type $Al_{1-x}Ga_xAs$ ($0 \leq x < 1$), and the quantum well layer 22 may be formed of $Al_{1-y}Ga_yAs$ ($y<x$). Or when the semiconductor substrate 10 is formed of GaAs as described above, the clad layers 21 and 23 may be formed of n-type or p-type $Al_{1-x}Ga_xAs$ ($0 \leq x < 1$), and the quantum well layer 22 may be formed of $In_{1-y}Ga_yAs$ ($0 \leq y < 1$). Or when the semiconductor substrate 10 is formed of GaAs as described above, the clad layers 21 and 23 may be formed of n-type or p-type $In_{1-x}Ga_xP$, and the quantum well layer 22 may be formed of GaAs. The carrier concentration of the waveguide 20 is determined so that the real part of the dielectric constant of the waveguide 20 is negative for THz waves of the wavelength to be detected (predetermined wavelength) and is, for example, $10^{24}$ m$^{-3}$ ($10^{18}$ cm$^{-3}$).

Also, an aperture 24 (focusing portion), which is a penetrating hole that penetrates through the waveguide 20 in the Z-axis direction, is formed in the waveguide 20. The aperture 24 extends in the Y-axis direction, and the length thereof in the X-axis direction is shorter than the predetermined wavelength and is, for example, 50 μm when the predetermined wavelength is 100 μm. A portion (hereinafter referred to as the "first region") 11a of the top surface 11 of the semiconductor substrate 10 is exposed from the aperture 24, and a wave receiving portion 30 is disposed on the first region 11a.

The wave receiving portion 30 of the optical device 1A has a pair of antenna electrodes 31 and 32 that are formed, for example, of gold, and the respective antenna electrodes 31 and 32 extend along edges 24a and 24b of the aperture 24 that extend in the Y-axis direction. The antenna electrodes 31 and 32 are disposed so that a gap is formed between protruding portions formed at central portions of the respective antenna electrodes 31 and 32. Although in FIG. 1, the antenna electrodes 31 and 32 are disposed so as to lie above both the waveguide 20 and the semiconductor substrate 10, it is sufficient that these electrodes be disposed above the semiconductor substrate 10 exposed from the aperture 24.

In the waveguide 20, periodic structure portions 25A, each having a predetermined periodic structure, are disposed at both sides of the aperture 24. Put in another way, by the aperture 24 being formed in a portion of the waveguide 20 having the predetermined periodic structure, the portions at both sides of the aperture 24 are made to be the periodic structure portions 25A.

The cross-sectional shape in the XZ plane of each of the periodic structure portions 25A of the waveguide 20 is a substantially triangular-wave-like shape having a plurality of peak portions 26a and valley portions 26b, positioned between adjacent peak portions 26a. With the plurality of peak portions 26a (or valley portions 26b), the interval in the X-axis direction between adjacent peak portions 26a (or valley portions 26b) is fixed. Thus in the X-axis direction, each periodic structure portion 25A has a periodic uneven pattern 26 (predetermined periodic structure, surface plasmon wave generating portion) with a substantially triangular-wave-like cross-sectional shape. In this case, the quantum well layer 22 that constitutes a portion of the waveguide 20 also has the uneven pattern 26 and the cross-sectional shape in the XZ plane of the quantum well layer 22 is a substantially triangular-wave-like shape.

With this arrangement, the quantum well layer 22 has a plurality of intersecting regions 22a, which are regions that intersect the XY plane (hypothetical plane) in the X-axis direction, and the plurality of intersecting regions 22a are continuous so as to form the uneven pattern 26. In other words, of the plurality of intersecting regions 22a, adjacent intersecting regions 22a are inclined to mutually opposite sides with respect to the Z-axis direction and continuous so as to form the shape of the uneven pattern 26.

Also as shown in FIGS. 3A and 3B, the cross-sectional shape in the YZ plane of each periodic structure portion 25A is a substantially rectangular-wave-like shape having a plurality of peak portions 27a and valley portions 27b, positioned between adjacent peak portions 27a. With the plurality of peak portions 27a (or valley portions 27b), the interval in the Y-axis direction between adjacent peak portions 27a (or valley portions 27b) is fixed. Thus in the Y-axis direction, each periodic structure portion 25A has a periodic uneven pattern 27 with a substantially rectangular-wave-like cross-sectional shape. With this arrangement, the quantum well layer 22 has a plurality of intersecting regions 22b that are discretely positioned in the Y-axis direction and extend in the X-axis direction.

The periodic structure portions 25A are formed as follows. That is, as shown in FIGS. 1, 2A, and 2B, the periodic structure portions 25A are formed by forming the predetermined periodic structures, with which the uneven patterns 26 and 27 are combined, at the regions (second regions) 11b at both sides of the first region 11a of the top surface of the semiconductor substrate 10 and then laminating the clad layer 21, quantum well layer 22, and the clad layer 23 onto the second regions 11b.

With the optical device 1A, by the quantum well layer 22, which constitutes the waveguide 20, having the intersecting regions 22a, the waveguide 20 is made to function as a waveguide structure that guides surface plasmon waves. This shall now be described in more detail.

Figure 4:
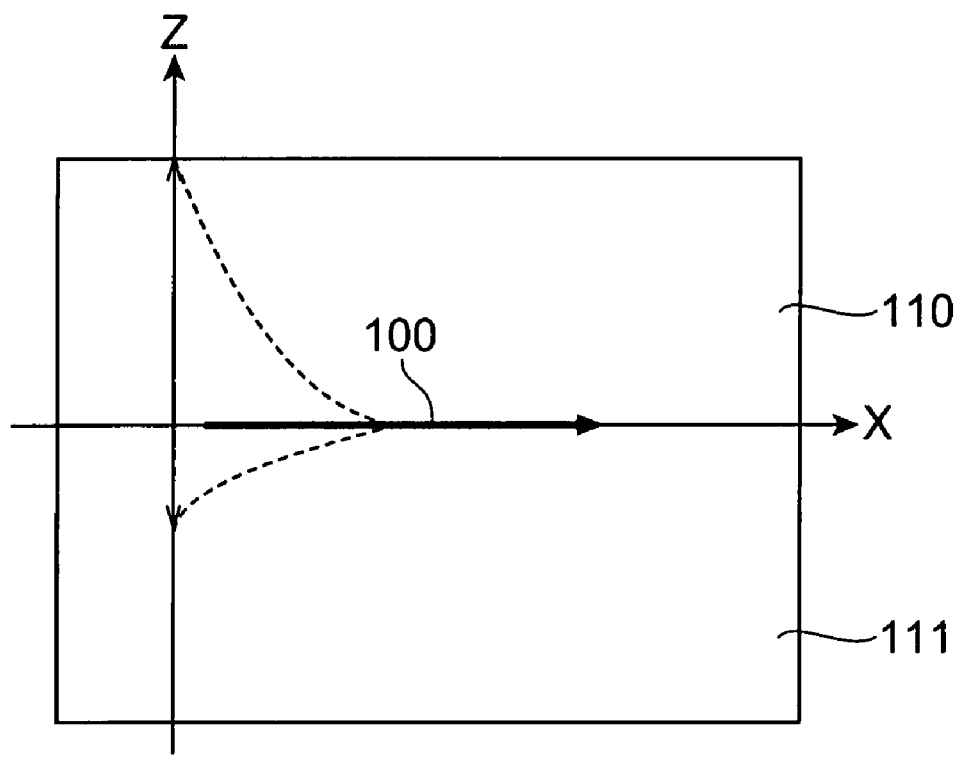
FIG. 4 is a conceptual diagram of a surface plasmon wave.

First, a surface plasmon wave shall be described. FIG. 4 is a conceptual diagram of a surface plasmon wave. The surface plasmon wave (propagated in direction 100) is a wave that propagates along an interface of a dielectric 110 having a positive dielectric constant $\epsilon_d$ and a conductive substance 111 having a dielectric constant $\epsilon_m$ ($=\epsilon_{mr}+i\epsilon_{mi}$) with a negative real part $\epsilon_{mr}$, and the amplitude direction of the surface plasmon wave is a direction (the Z-axis direction in FIG. 4) that is substantially orthogonal to the interface. The wave number $k_{sp}$ of the surface plasmon wave (propagated in direction 100) is expressed by Equation (1), where ω is the oscillation frequency and c is the speed of light in vacuum:

[Equation 1]

$$k_{sp} = \frac{\omega}{c}\sqrt{\frac{\epsilon_d \cdot \epsilon_m}{\epsilon_d + \epsilon_m}} \tag{1}$$

Because the dielectric constant $\epsilon_m$ of the conductive substance 111 has an imaginary part $\epsilon_{mi}$, the surface plasmon wave (propagated in direction 100) propagates while becoming attenuated. A propagation distance L of the surface plasmon wave (propagated in direction 100) is expressed by Equation (2), with $k_{spi}$ being the imaginary part of the wave number $k_{sp}$:

[Equation 2]

$$L = \frac{1}{2|k_{spi}|} \tag{2}$$

As a method for generating the surface plasmon wave (propagated in direction 100) using light, there is a method that employs a grating. That is, if in a case where λ ($=\omega/c$) is the wavelength in vacuum of light of the oscillation frequency ω that is to be converted to the surface plasmon wave (propagated in direction 100) and the light of the wavelength λ is to be made incident on a grating, the period of the grating is the period $\Lambda_{sp}$ determined by Equation (3), surface plasmon resonance occurs and excitation of the surface plasmon wave (propagated in direction 100) occurs.

[Equation 3]

$$A_{sp} = m\lambda \sqrt{\frac{\varepsilon_d + \varepsilon_m}{\varepsilon_d \cdot \varepsilon_m}} \qquad (3)$$

In Equation (3), m is a diffraction order, which is a positive integer.

That the surface plasmon wave (propagated in direction 100) described above can be excited and propagated by the waveguide 20 having the intersecting regions 22a shall now be described.

With the optical device 1A, because the carrier concentration of the waveguide 20 that has the quantum well structure is determined so that the real part of the dielectric constant of the waveguide 20 is negative for THz waves of a predetermined wavelength, the waveguide 20 functions as the conductive substance 111.

In a case where a quantum well structure is prepared in a planar manner (that is, so as to be substantially parallel to the XY plane), electron oscillations in the quantum well layer do not have a component in the Z-axis direction, and the electron oscillations in the quantum well layer thus do not contribute to oscillation of surface plasmon waves.

Meanwhile, with the optical device 1A, the waveguide 20 has the uneven pattern 26 of substantially triangular-wave-like cross-sectional shape in the X-axis direction, and the quantum well layer 22 thus has the intersecting regions 22a as described above. Because in each intersecting region 22a, the oscillation direction of electrons (direction of arrow A in FIG. 2B) intersects the XY plane, a Z-axis direction component is always present in the electron oscillation direction. Thus in the intersecting regions 22a, excitation of the surface plasmon wave (propagated in direction 100) is possible and propagation of the surface plasmon wave (propagated in direction 100) is possible. Because each intersecting region 22a included in the waveguide 20 extends in the Y-axis direction, the surface plasmon wave (propagated in direction 100) can be propagated in the Y-axis direction, and because the plurality of intersecting regions 22a are continuous in the X-axis direction, the surface plasmon wave (propagated in direction 100) can also propagate in the X-axis direction as shown in FIG. 2B.

Also with the optical device 1A, a period $\Lambda 1$ of the uneven pattern 26 is determined so that when a THz wave of a wavelength $\lambda 1$ as the predetermined wavelength is made incident on the uneven pattern 26, surface plasmon resonance occurs and excitation of the surface plasmon wave (propagated in direction 100) occurs. Specifically, when, in FIG. 4 and Equation (3), the wavelength $\lambda$ is $\lambda 1$, the conductive substance 111 is the waveguide 20, and the dielectric 110 is air, the period $\Lambda_{sp}$ is set to the period $\Lambda 1$ of the uneven pattern 26. For example, when the dielectric constant $\in_m$ of the waveguide 20 for THz waves of 100 μm wavelength is such that $\in_m = -79+5i$ (i is an imaginary number), the dielectric constant of air is 1, and m is 1, the period $\Lambda 1$ of the uneven pattern 26 of the waveguide 20 is approximately 100 μm. The propagation distance L of the surface plasmon wave (propagated in direction 100) in this case is approximately 20 mm according to Equation (2). Because the period $\Lambda 1$ of the uneven pattern 26 is thus determined, the periodic uneven pattern 26 functions as a grating that is a surface plasmon wave generating portion.

As is clear from Equation (3), because the wave number of the surface plasmon wave (propagated in direction 100) depends on the oscillation frequency of the light made incident on the uneven pattern 26 that functions as a grating, the surface plasmon wave (propagated in direction 100) that is generated by the incidence of a THz wave has an oscillation frequency in the THz range.

Figure 9A:
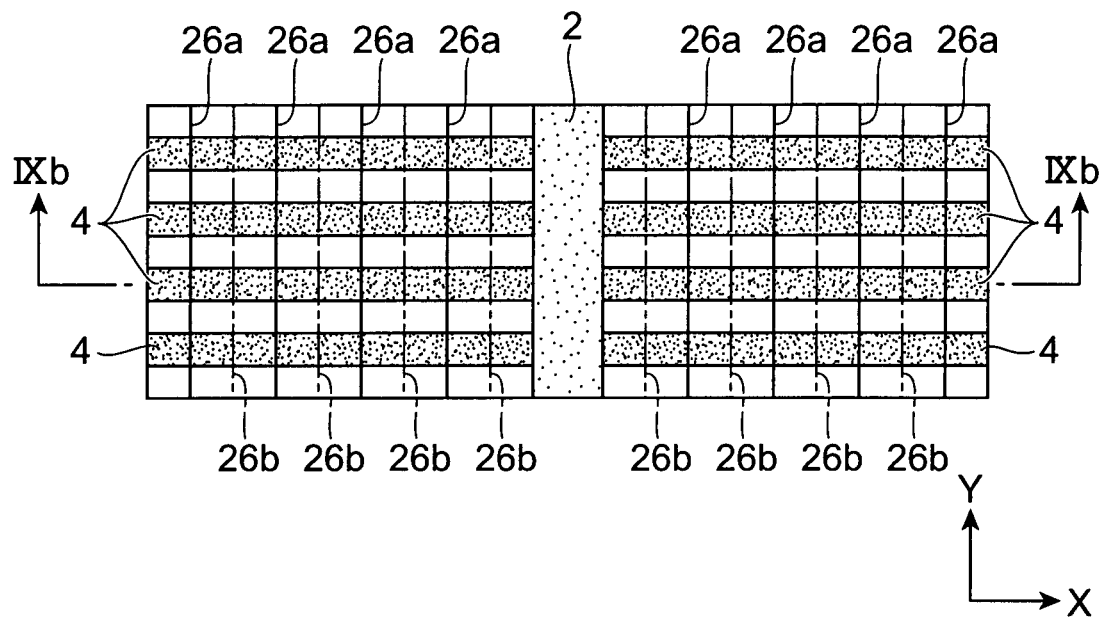
FIG. 9A is a diagram of a step in a process for manufacturing the optical device according to the first embodiment.
Figure 9B:
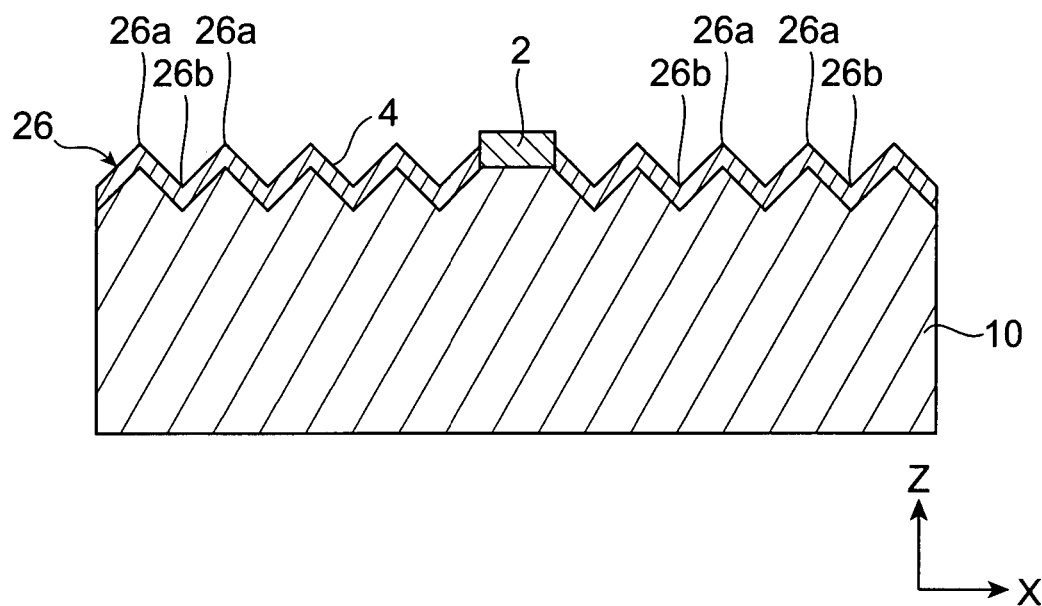
FIG. 9B is a diagram taken on line IXb-IXb of FIG. 9A.
Figure 10A:
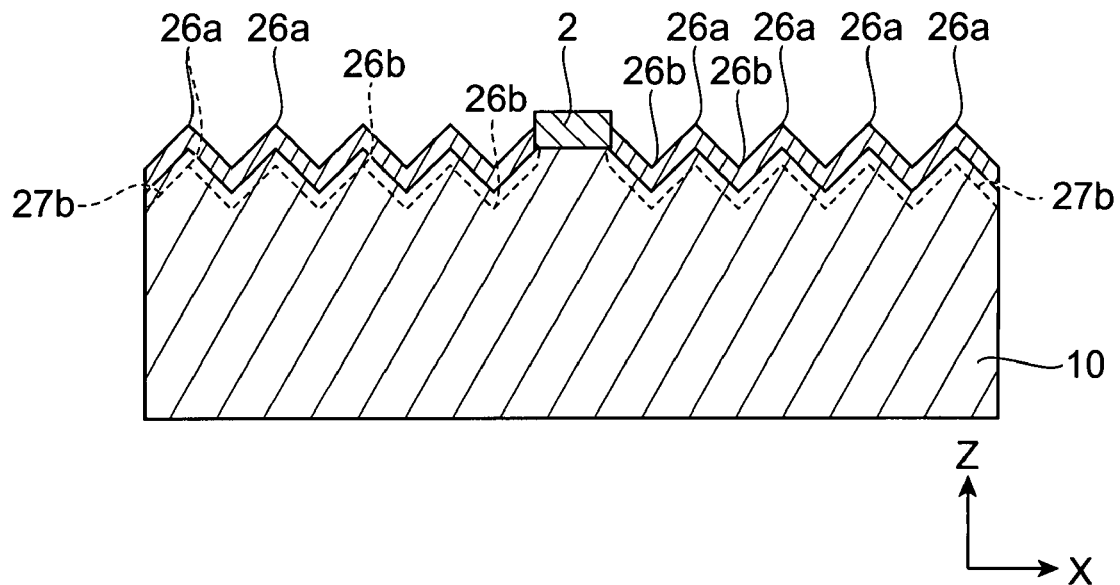
FIGS. 10A and 10B are diagrams of steps in a process for manufacturing the optical device according to the first embodiment.
Figure 10B:
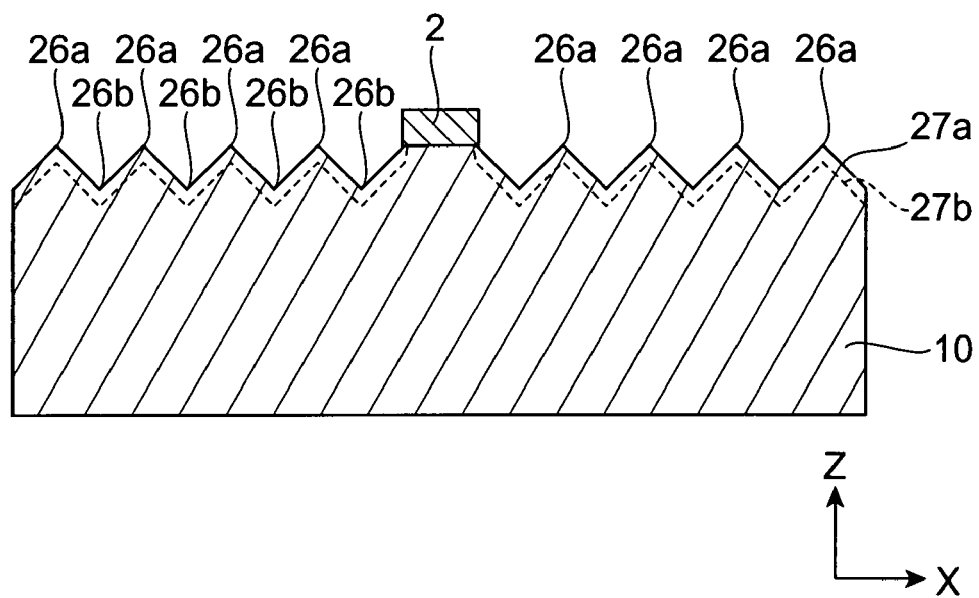

An example of a method for manufacturing the optical device 1A shall now be described using FIGS. 5A to 11C. FIGS. 5A to 11C are diagrams that sequentially illustrate a manufacturing process of the optical device 1A. Each of FIGS. 5A to 9B show a plan view and a sectional view of a step for forming the optical device 1A. With respect to the plan views shown in FIGS. 5A, 6A, 7A, 8A, and 9A, the sectional views shown in FIGS. 5B, 6B, 7B, 8B, and 9B show sectional arrangements along sectioning lines and correspond to sectional arrangements along line IIa-IIa of FIG. 1. FIGS. 10A and 10B show sectional views in steps after the step of FIG. 9B has been performed. FIGS. 11A to 11C show sectional views in steps after the step of FIG. 10B has been performed.

Figure 5A:
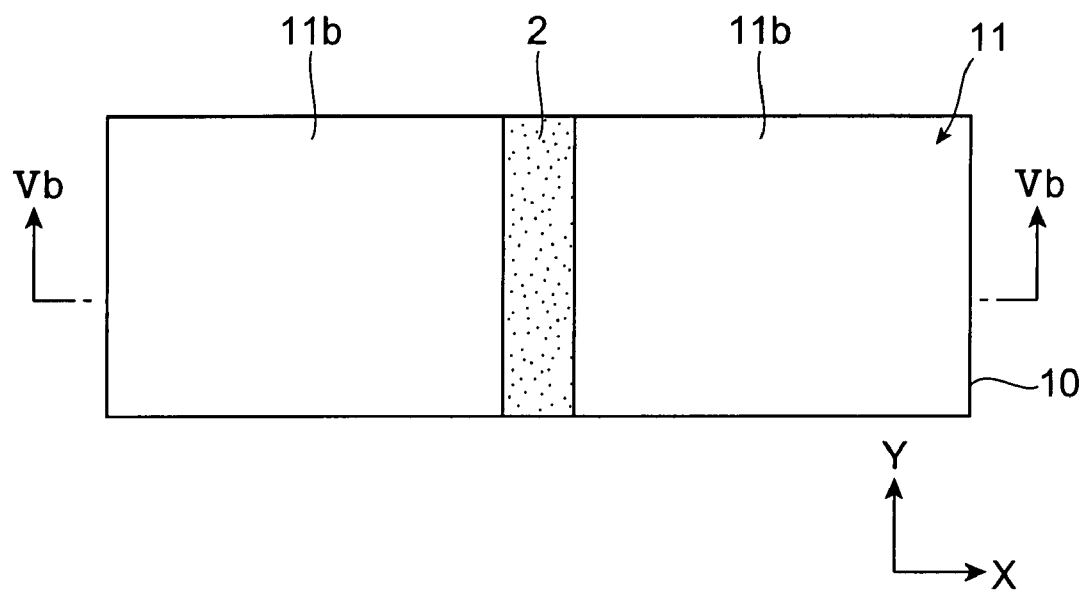
FIG. 5A is a diagram of a step in a process for manufacturing the optical device according to the first embodiment.
Figure 5B:
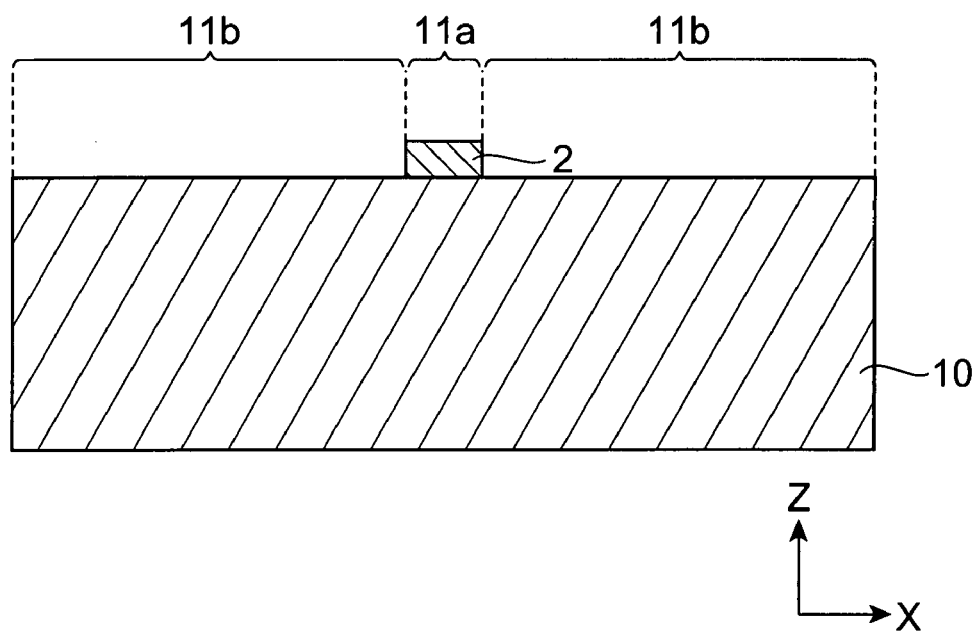
FIG. 5B is a diagram taken on line Vb-Vb of FIG. 5A.

First, as shown in FIGS. 5A and 5B, a silicon nitride film 2 is formed on a portion of the top surface 11 (principal surface) of the semiconductor substrate 10 of substantially rectangular parallelepiped shape that is formed of GaAs. In the plan view of FIG. 5A, the silicon nitride film 2 is indicated by hatching. The same is done in the plan views of FIGS. 6A to 9B. The silicon nitride film 2 has a size in the X-axis direction (width) of 50 μm and a size in the Y-axis direction (length) of 2 mm. On the top surface 11, the region in which the silicon nitride film 2 is formed becomes the first region 11a and the portions at both sides of the silicon nitride film 2 become the second regions 11b.

Figure 6A:
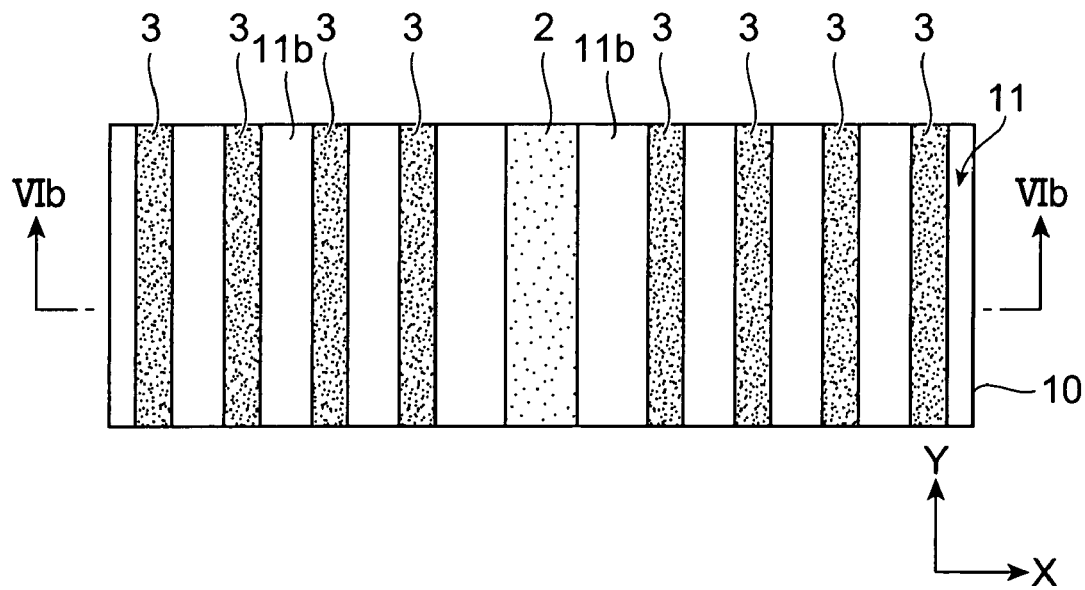
FIG. 6A is a diagram of a step in a process for manufacturing the optical device according to the first embodiment.
Figure 6B:
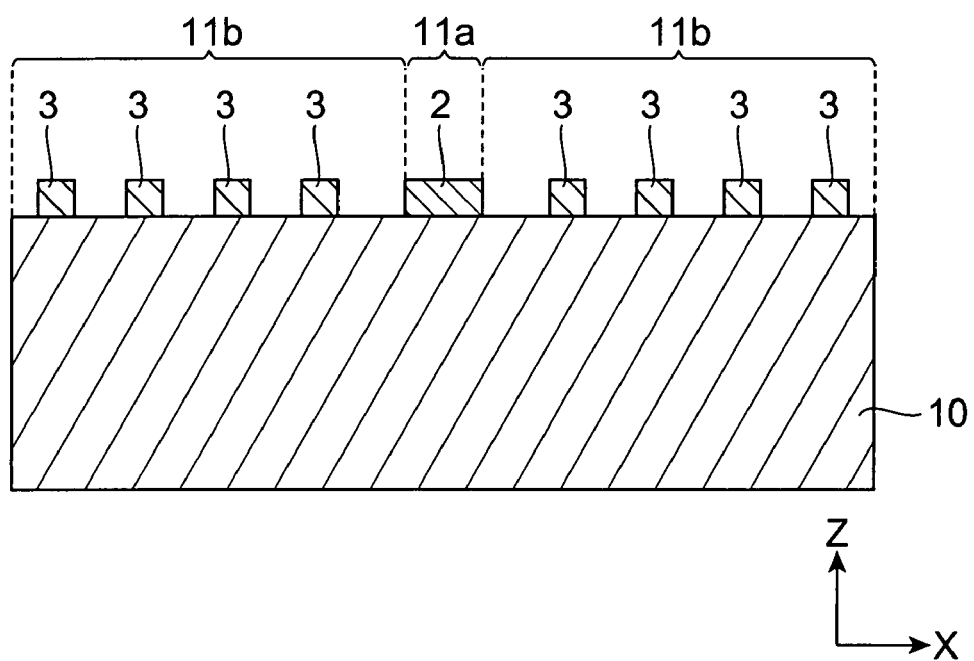
FIG. 6B is a diagram taken on line VIb-VIb of FIG. 6A.

Next, as shown in FIGS. 6A and 6B, a plurality of silicon nitride films 3 are formed at both sides of the nitride silicon film 2. Although the number of the silicon nitride films 3 is four in FIGS. 6A and 6B, for example, approximately 20 silicon nitride films 3 are preferably formed. The period of the silicon nitride films is 50 μm, and the films are formed so that the ratio of the size in the X-axis direction of each silicon nitride film 3 and the size of the interval between adjacent silicon nitride films 3, that is, the line/space ratio is 1:1.

Figure 7A:
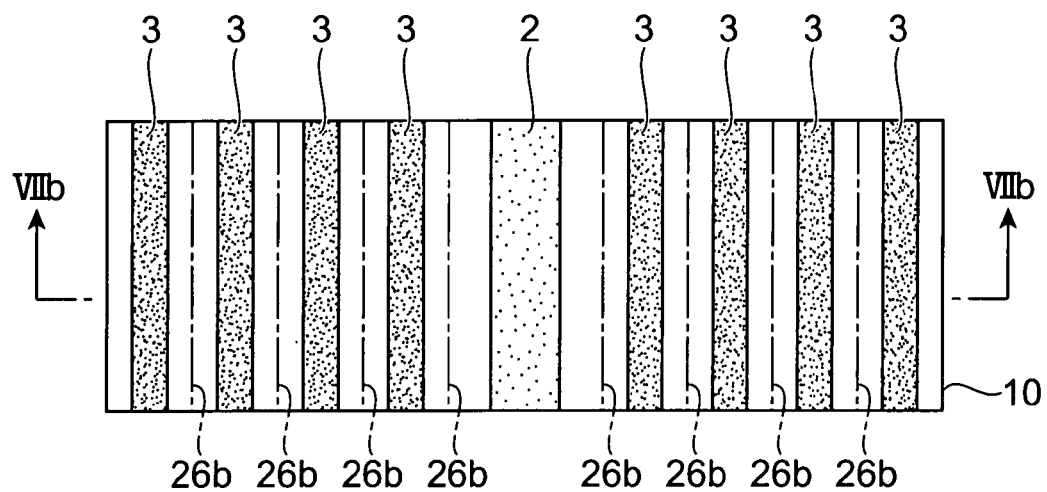
FIG. 7A is a diagram of a step in a process for manufacturing the optical device according to the first embodiment.
Figure 7B:
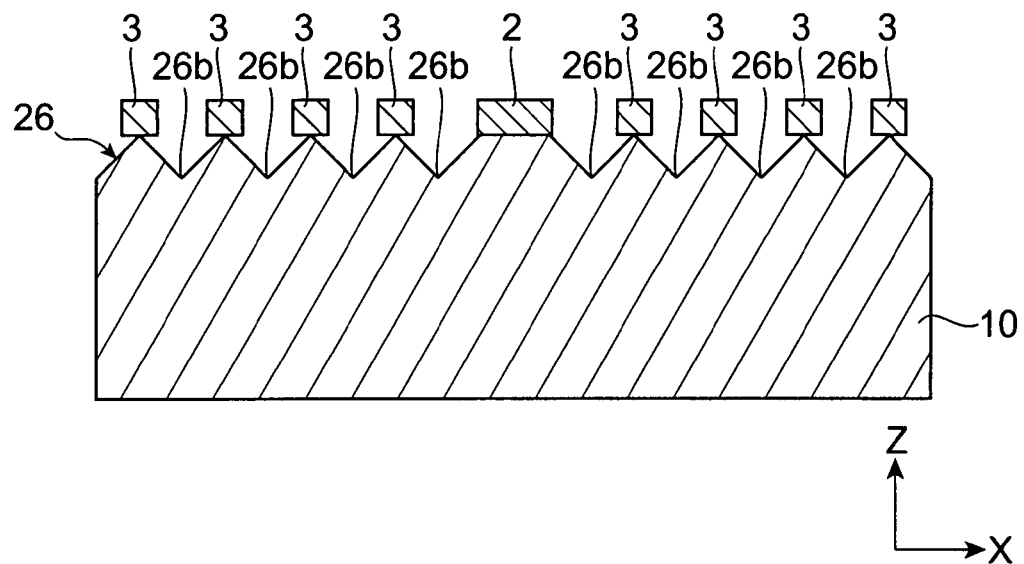
FIG. 7B is a diagram taken on line VIIb-VIIb of FIG. 7A.

Next, as shown in FIGS. 7A and 7B, an etchant that selectively etches GaAs with respect to silicon nitride is used to etch portions of the top surface 11 at which the silicon nitride films 2 and 3 are not formed. In the case of wet etching, because even the portions covered with the silicon nitride films 2 and 3 become etched from the sides, the uneven pattern 26 of substantially triangular wave form is formed in the second regions 11b as shown in FIG. 7B. In FIG. 7A, the valley portions 26b of the substantially triangular-wave-like uneven pattern 26 are indicated by alternate long and short dash lines. The same shall apply below when indicating the valley portions 26b in a plan view.

Figure 8A:
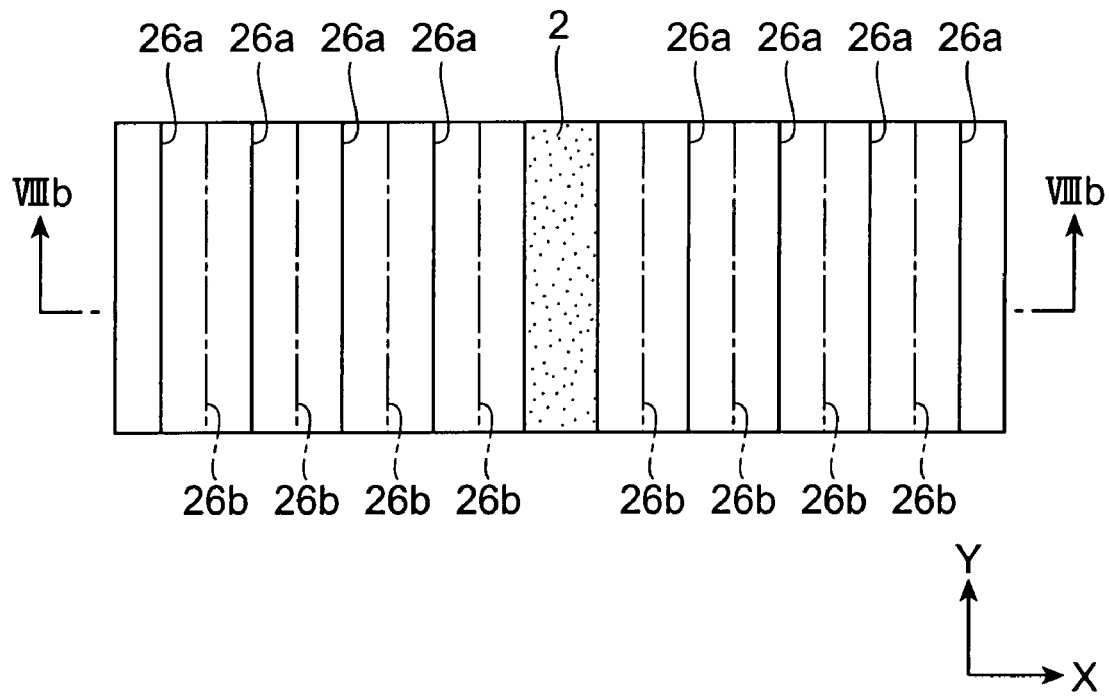
FIG. 8A is a diagram of a step in a process for manufacturing the optical device according to the first embodiment.
Figure 8B:
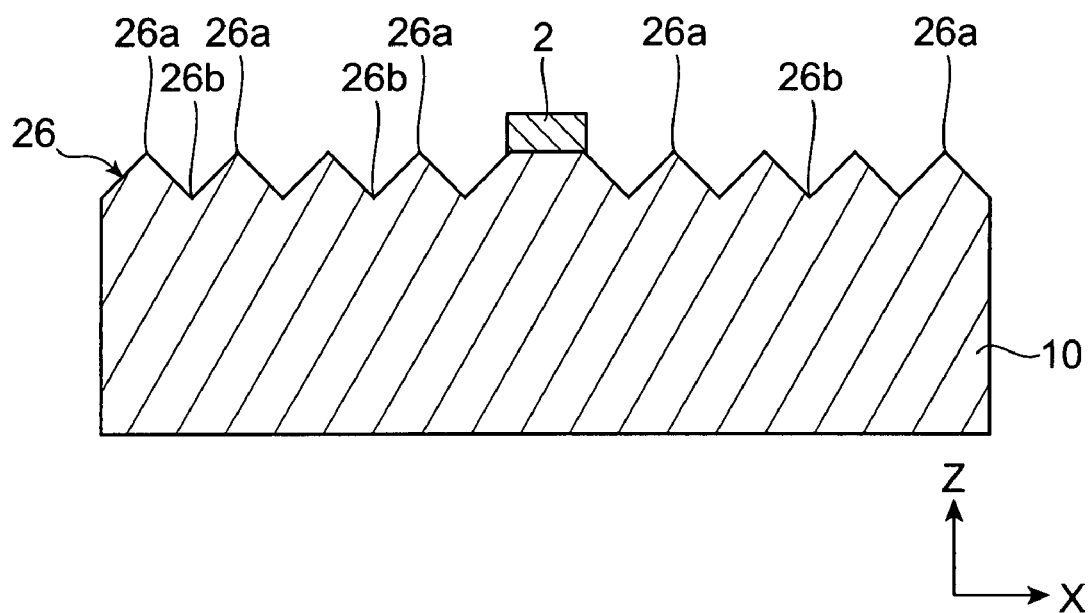
FIG. 8B is a diagram taken on line VIIIb-VIIIb of FIG. 8A.

After then protecting the silicon nitride film 2 by a resist, etc., in a photolithography process, the plurality of silicon nitride films 3 are removed by reactive ion etching (RIE) as shown in FIGS. 8A and 8B. Subsequently, a plurality of silicon nitride films 4 of a size of 4 μm in the Y-axis direction are formed in the Y-axis direction by a photolithography process as shown in FIGS. 9A and 9B. Although the number of the silicon nitride films 4 is four in FIGS. 9A and 9B, for example, approximately 20 silicon nitride films 4 are preferably formed.

Then as shown in FIG. 10A, regions of the semiconductor substrate 10 at which the silicon nitride films 2 and 4 are not formed are etched as shown in FIG. 10A. The etching may be performed using an etchant that selectively etches GaAs with respect to silicon nitride. Next, as shown in FIG. 10B, after protecting the silicon nitride film 2 by a resist, etc., in a photolithography process, the plurality of silicon nitride films 4 are removed by RIE. The uneven pattern 27 with a period of approximately 8 µm in the Y-axis direction is thereby formed. In FIGS. 10A and 10B, the portions that are to become the valley portions 27b are indicated by broken lines.

Next, as shown in FIG. 11A, a clad layer 21, constituted of n-type AlGaAs, a quantum well layer 22, constituted of GaAs, and a GaAs clad layer 23 are grown in that order by a metal organic chemical vapor deposition, etc., on the second regions 11b to form waveguide 20. The Al composition ratio in the clad layer 21 is 30%, and by doping Si, the carrier concentration is set to $4 \times 10^{24}$ m$^{-3}$ ($4 \times 10^{18}$ cm$^{-3}$). The quantum well layer 22 is prepared as a semi-insulating layer. However, after forming the laminated structure, the carriers in the clad layer fall into the quantum wells and the carrier concentration in the quantum well layer 22 thus rises to approximately $4 \times 10^{24}$ m$^{-3}$ ($4 \times 10^{18}$ cm$^{-3}$). The clad layer 21, the quantum well layer 22, and the clad layer 23 are grown to thicknesses of 100 nm, 10 nm, and 500 nm, respectively. After then removing the silicon nitride film 2 by RIE as shown in FIG. 11B, a pair of antenna electrodes 31, 32 for THz wave detection are formed as shown in FIG. 11C, and the optical device 1A, shown in FIGS. 1, 2A and 2B, is thereby obtained.

The numerical values indicated above for the method for manufacturing the optical device 1A are those of one example, and the arrangement of the optical device 1A is not restricted to the numerical values indicated for the above-described manufacturing method and does not necessarily match the numerical values given as examples in the description of FIGS. 1 to 3B. Also, the silicon nitride films 2 to 4 are used as masks for forming the aperture 24 and the uneven patterns 26 and 27. These films are thus not restricted in particular as long as the films can be used as masks.

Actions and effects of the optical device 1A shall now be described. As shown in FIG. 2A, after THz waves 40 of a wavelength λ1 are made incident from a rear surface 12 of the semiconductor substrate 10 of the optical device 1A, the THz waves 40 propagate through the semiconductor substrate 10 and become incident on the waveguide 20. In regard to the incidence of THz waves onto the optical device 1A, although the THz waves may be made incident directly onto the rear surface 12, for example, a lens, formed of Si, may be disposed on the rear surface 12 side and the THz waves may be made incident upon being converged by the lens.

When the THz waves 40 are made incident on the waveguide 20, because in the waveguide 20, the periodic structure portions 25A have the uneven pattern 26 as a surface plasmon wave generating portion, surface plasmon resonance occurs as a result of incidence of the THz waves 40 of the wavelength λ1 onto the periodic structure portions 25A. Also due to the incidence of the THz waves 40, electron oscillations occur in the quantum well layer 22 in the periodic structure portions 25A, and these electron oscillations have components in the Z-axis direction, which is the same as the electric field oscillation direction of surface plasmon waves (propagated in direction 100). As a result, the surface plasmon waves (propagated in direction 100) are generated efficiently by the incidence of the THz waves 40 onto the periodic structure portions 25A.

The surface plasmon waves (propagated in direction 100) generated in the periodic structure portions 25A propagate in the X-axis direction via the plurality of intersecting regions 22a. Because the aperture 24, with an interval narrower than the wavelength λ1, is disposed along the optical path (along the propagation direction) of the surface plasmon waves (propagated in direction 100) that propagate through the plurality of intersecting regions 22a, the surface plasmon waves (propagated in direction 100) generated at the periodic structure portions 25A are focused to the aperture 24. The surface plasmon waves (propagated in direction 100) are then detected by the pair of antenna electrodes 31 and 32, disposed on the aperture 24. A portion of the surface plasmon waves (propagated in direction 100) that are focused to the aperture 24 becomes scattered at the boundary of the aperture 24 and the waveguide 20 and becomes reconverted into THz waves with the same oscillation frequency as the surface plasmon waves (propagated in direction 100). The antenna electrodes 31 and 32 thus also detect the THz waves reconverted from the surface plasmon wave (propagated in direction 100) focused to the aperture 24. Because the surface plasmon waves (propagated in direction 100) or the THz waves, reconverted from the surface plasmon waves (propagated in direction 100), that are detected at the wave receiving portion 30 are generated according to the THz waves 40 made incident on the optical device 1A, the optical device 1A can detect the incident THz wave 40.

Because as described above, with the optical device 1A, the THz waves 40 are detected upon being converted once into the surface plasmon waves (propagated in direction 100) and focused to the aperture 24, detection upon focusing to a dimension no more than the wavelength is enabled. Because the THz waves 40 can thus be detected in a state of high energy density, the THz waves 40 can be detected efficiently.

Also, because the period Λ1 of the uneven pattern 26 is determined to give rise to the surface plasmon waves (propagated in direction 100) upon incidence of the THz waves 40 with the wavelength λ1 as the predetermined wavelength, when, for example, THz waves that are made incident on the optical device 1A have a plurality of wavelengths, including the wavelength λ1, the THz waves 40 of the wavelength λ1 can be detected selectively from among the incident THz waves.

Furthermore, because the waveguide 20 has a quantum well structure constituted of a semiconductor, the forming of the uneven patterns 26 and 27 and, consequently, the manufacture of the optical device 1A is easy in comparison to the case of using gold, silver, or other metal as described in Tsutomi Ishi, et al., "Si Nano-Photodiode with a Surface Plasmon Antenna," Japanese Journal of Applied Physics, 2005, Vol. 44, No. 12, pp. L364-L366.

Furthermore with the optical device 1A, because the surface plasmon wave (propagated in direction 100) is propagated using the waveguide 20 with the intersecting regions 22a (more specifically, the periodic structure portions 25A), the surface plasmon waves (propagated in direction 100) are made long in the propagation distance L. This point shall now be described in more detail.

As was described using FIG. 4, in order to make a surface plasmon wave (propagated in direction 100) propagate in the interface between the dielectric 110 and the conductive substance 111, the real part $\in_{mr}$ of the dielectric constant $\in_m$ of the conductive substance 111 must be negative. In order to make the real part $\in_{mr}$ of the dielectric constant $\in_m$ of a semiconductor negative in the THz region of the wavelength range of 30 µm to 1000 µm or the oscillation frequency of $1.9 \times 10^{12}$ to $6.3 \times 10^{13}$ (1/s), the following carrier concentration is necessary. That is, if the scattering time τ of free electrons in the semiconductor is $4 \times 10^{-13}$ seconds, a carrier concentration of $2.2 \times 10^{21}$ to $9.8 \times 10^{23}$ m$^{-3}$ ($2.2 \times 10^{15}$ to $9.8 \times 10^{23}$ cm$^{-3}$) is required for the oscillation frequency range of $1.9 \times 10^{12}$ to $1.9 \times 10^{13}$ (1/s). To achieve such a carrier concentration, an impurity such as Sn, Si, etc., must be doped into the semiconductor. Meanwhile, because in a semiconductor, the scattering time τ and the carrier mobility μ are in a proportional relationship, the carrier mobility μ decreases as the carrier concentration increases due to the presence of an impurity.

Meanwhile, with the optical device 1A, the waveguide 20, which is a quantum well structure with intersecting regions 22a, is employed to excite and propagate the surface plasmon wave (propagated in direction 100). Because a quantum well structure can be prepared by spatially separating the impurity and the carrier movement space, the carrier mobility does not decrease even if the carrier concentration is increased. Consequently with the optical device 1A, the surface plasmon wave (propagated in direction 100) can be made to propagate over a longer distance. Because the propagation distance of the surface plasmon wave (propagated in direction 100) can thus be made long, the efficiency of focusing to the aperture 24 is improved. The THz wave 40 can thus be detected more efficiently and reliably. Also, because the area occupied by the waveguide 20 can be made small, high density integration is enabled for forming an array.

Because as described above, the waveguide 20 has the uneven pattern 27 in the Y-axis direction, the quantum well layer 22 has a plurality of intersecting regions 22b in the Y-axis direction. Because each intersecting region 22b extends in the X-axis direction, the surface plasmon wave (propagated in direction 100) can be focused to the aperture 24 via the intersecting regions 22b as well.

Second Embodiment

Figure 12:
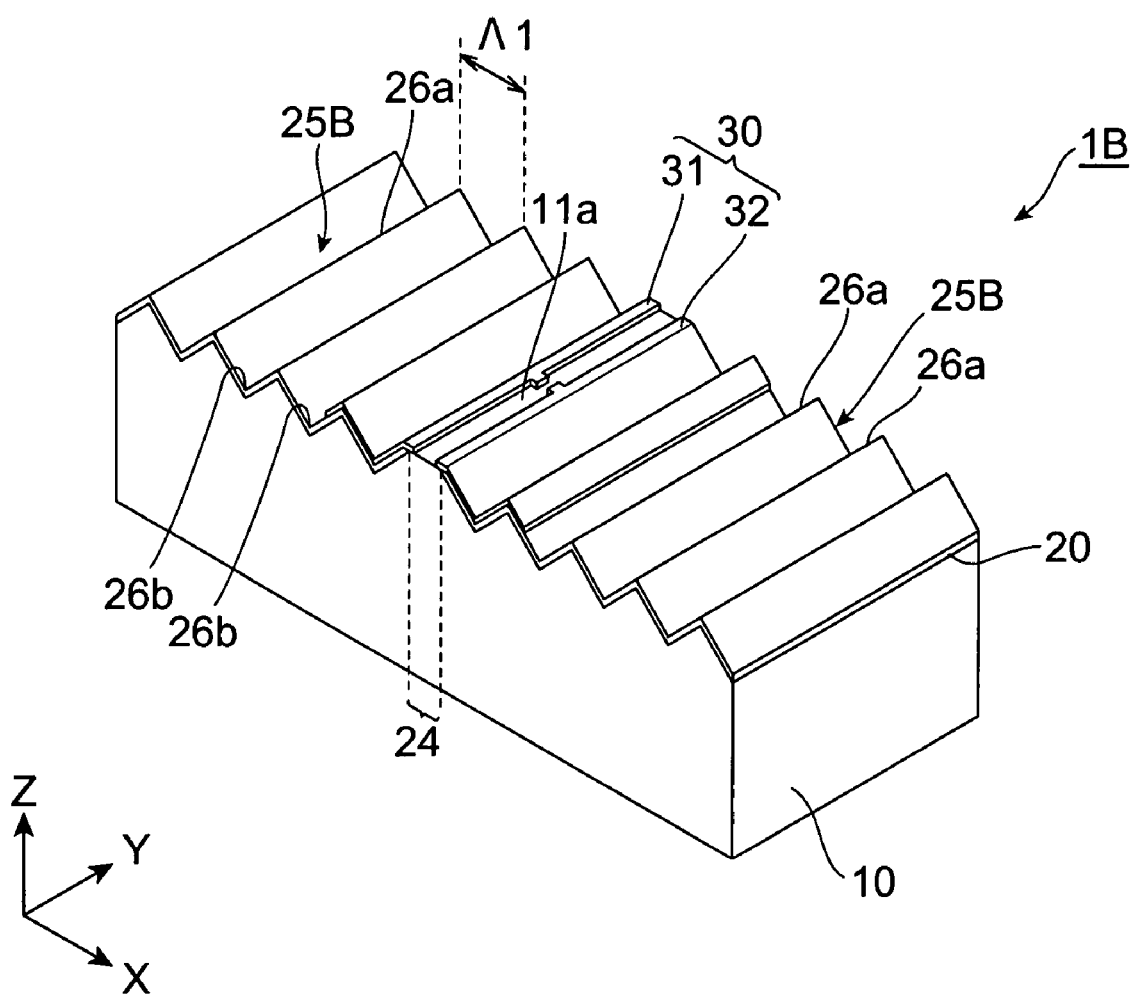
FIG. 12 is a perspective view of a second embodiment of an optical device according to the present invention.

FIG. 12 is a perspective view of a second embodiment of an optical device according to the present invention. A main difference in terms of arrangement of the optical device 1B with respect to the optical device 1A is that whereas the periodic structure portion 25B of the waveguide 20 has the uneven pattern 26 in the X-axis direction, there is no uneven pattern in the Y-axis direction. The optical device 1B shall now be described mainly in regard to this point.

The aperture 24 (focusing portion) is formed in the waveguide 20 laminated onto the semiconductor substrate 10 of the optical device 1B and the regions at both sides of the aperture 24 are the periodic structure portions 25B. The periodic structure portions 25B have the uneven pattern 26, having the period Λ1 and functioning as the surface plasmon wave generating portion.

The optical device 1B is formed is manufactured for example as follows. First, the steps illustrated in FIGS. 5A to 8B of the manufacturing process of the optical device 1A of the first embodiment are performed. After performing the step shown in FIGS. 8A and 8B, the clad layer 21, the quantum well layer 22, and the clad layer 23 are grown on the second regions 11b to form the waveguide 20 in the same manner as the process shown in FIGS. 11A to 11C without performing the steps shown in FIGS. 9A to 10B. The pair of antenna electrodes 31 and 32 are then formed on the aperture 24, and the optical device 1B is thereby formed.

With the optical device 1B, because the waveguide 20 has the uneven pattern 26, the same actions and effects as those of the optical device 1A are exhibited. That is, with the optical device 1B, because the waveguide 20, constituted of the quantum well structure having the uneven pattern 26 formed therein, has the plurality of intersecting regions 22a that are made continuous so as to take on the shape of the uneven pattern 26, the waveguide 20 functions as the waveguide structure for surface plasmon waves (propagated in direction 100). In this case, because the quantum well structure is employed as the waveguide structure, the surface plasmon waves (propagated in direction 100) can be made to propagate over a longer distance. Because the efficiency of focusing of the surface plasmon waves (propagated in direction 100) to the aperture 24 is thereby improved, THz waves can be detected efficiently and at high sensitivity. Also, due to employing the quantum well structure for excitation and propagation of the surface plasmon waves (propagated in direction 100), the optical device 1B can be manufactured easily. Furthermore, because the area occupied by the waveguide 20 can be made small, high density integration is enabled for forming an array.

Third Embodiment

Figure 13:
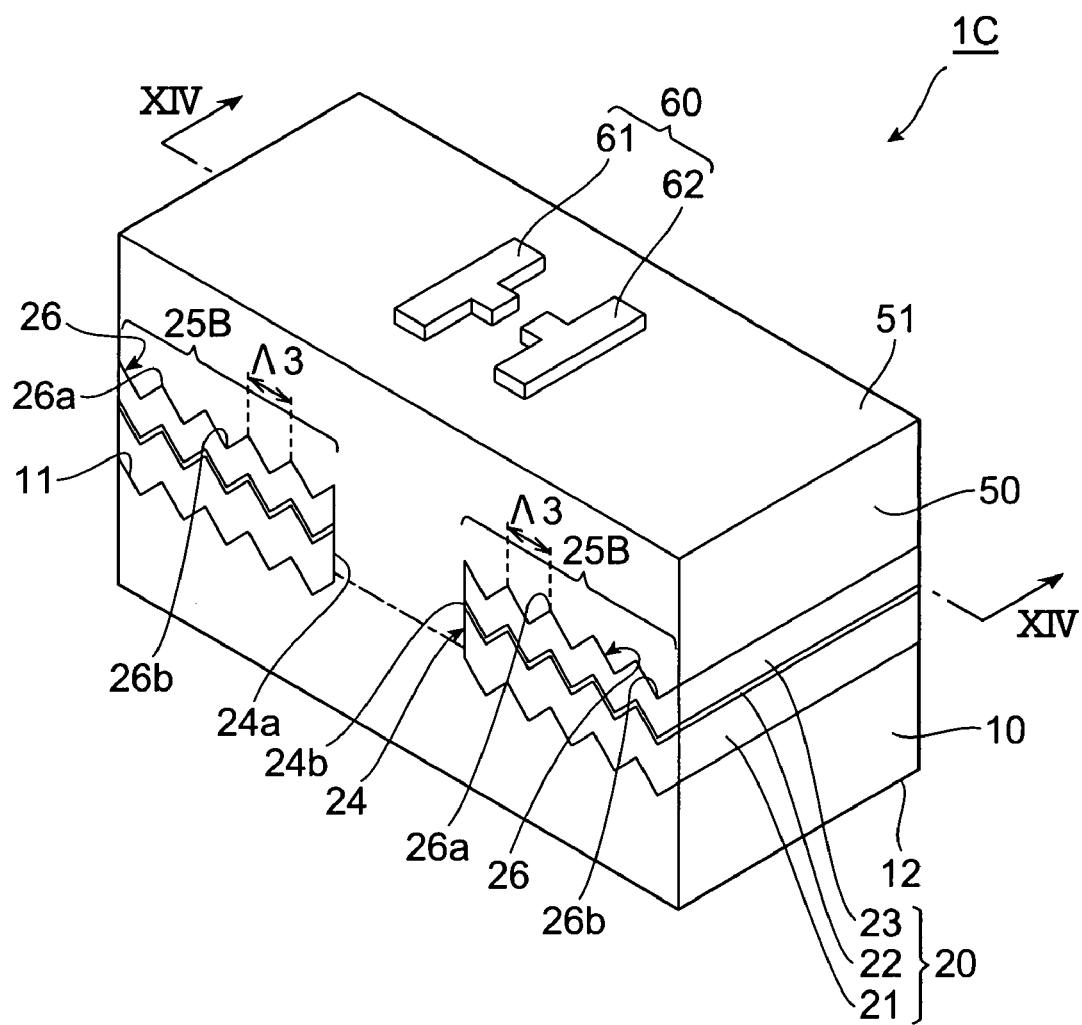
FIG. 13 is a perspective view of a third embodiment of an optical device according to the present invention.
Figure 14:
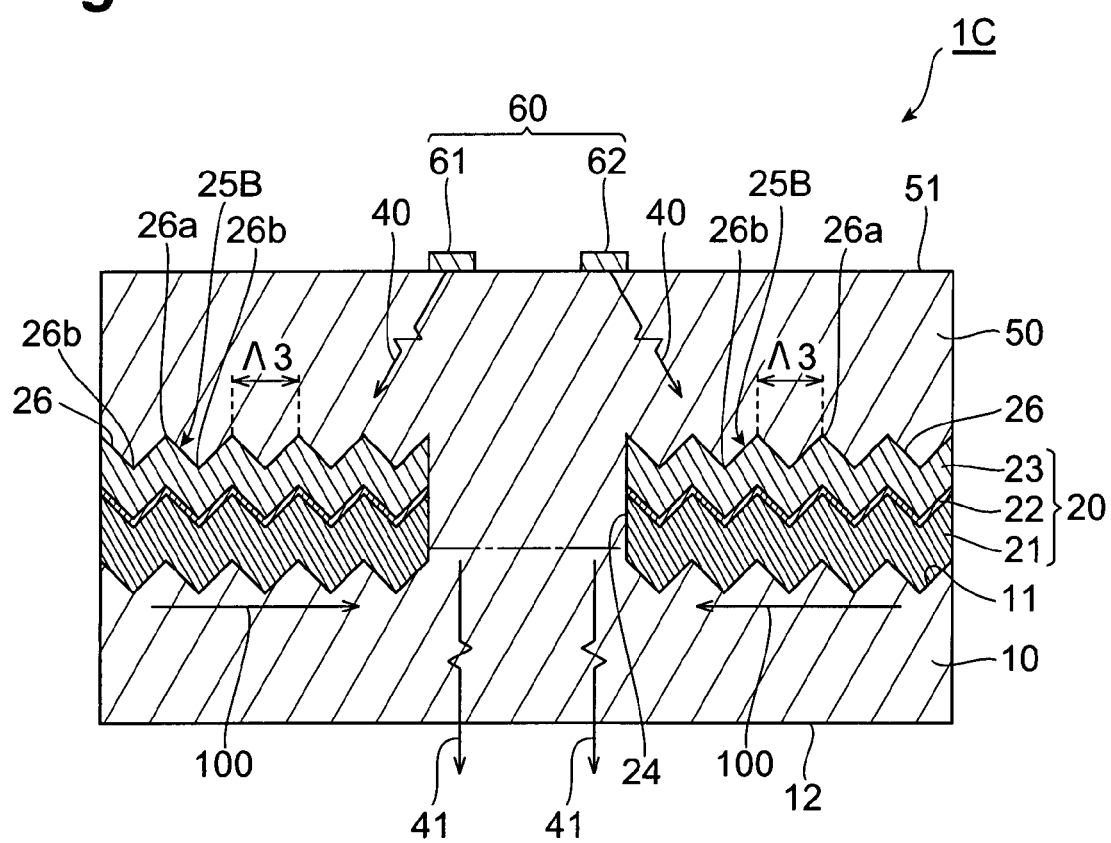
FIG. 14 is a sectional view taken on line XIV-XIV of FIG. 13.

FIG. 13 is a perspective view of a third embodiment of an optical device according to the present invention. FIG. 14 is a sectional view taken on line XIV-XIV of FIG. 13.

The optical device 1C is a THz wave generating element that generates a THz wave. Main differences in terms of arrangement between the optical device 1C and the optical device 1B of the second embodiment are that with the optical device 1C, a semiconductor layer 50 is laminated further on the waveguide 20, which is laminated onto the semiconductor substrate 10, and a THz generating portion 60 is disposed on a top surface 51 of the semiconductor layer 50. The optical device 1C shall now be described mainly in regard to this point. The alternate long and short dash lines in FIGS. 13 and 14 schematically indicate a boundary between the semiconductor substrate 10 and the semiconductor layer 50 for the sake of description. Also for illustration of the arrangement of the waveguide 20, the waveguide 20 is indicated in an enlarged manner in FIGS. 13 and 14.

With the optical device 1C, the semiconductor layer 50 is laminated further onto the layer-like waveguide 20, which is laminated onto the semiconductor substrate 10. The aperture 24 formed in the waveguide 20 is thus filled by a portion of the semiconductor layer 50.

The semiconductor layer 50 is not restricted in particular as long as THz waves can be propagated and is formed, for example, of semi-insulating GaAs. The THz generating portion 60 on the semiconductor layer 50 is constituted of a pair of THz wave generating electrodes 61 and 62 that generate THz waves of a wavelength λ1 as a predetermined wavelength upon incidence of an excitation light. Each of the THz wave generating electrodes 61 and 62 is formed, for example, of gold and is disposed above the aperture 24 on the top surface 51 of the semiconductor layer 50. More specifically, the respective THz wave generating electrodes 61 and 62 are disposed along the edges 24a of the aperture 24 that extend in the Y-axis direction and are positioned so that a gap forms between protruding portions of the respective THz wave generating electrodes 61 and 62.

With the optical device 1C, a period Λ3 of the uneven pattern 26 is determined so that when THz waves of the wavelength λ1, output from the THz wave generating electrodes 61 and 62, are made incident on the periodic structure portions 25B having the uneven pattern 26, surface plasmon resonance occurs and surface plasmon waves (propagated in direction 100) propagate at the semiconductor substrate 10 side. That is, with the optical device 1C, the period Λ3 is set to the period Λsp that is computed with the waveguide 20 as the conductive substance 111 shown in FIG. 4, the semiconductor substrate 10 as the dielectric 110, and the wavelength λ in Equation (3) being λ1. Thus for example, if the semiconductor substrate 10 and the semiconductor layer 50 are respectively formed of GaAs and THz waves of a wavelength of 100 μm are output from the THz wave generating portion 60, the period Λ3 of the uneven pattern 26 of the optical device 1C is approximately 30 μm. Also, the propagation distance of the generated surface plasmon waves (propagated in direction 100) is approximately 450 μm.

The optical device 1C is manufactured for example as follows. First, as in the manufacturing process of the optical device 1B of the second embodiment, the steps illustrated in FIGS. 5A to 8B are performed. In this process, a silicon nitride film 3 of a width, for example, of 15 μm is formed in the step of FIGS. 5A and 5B. After then performing the step shown in FIGS. 8A and 8B, the waveguide 20 is formed above the second regions 11b. After further forming the semiconductor layer 50 above the waveguide 20, the THz wave generating electrodes 61 and 62 are formed above the aperture 24, and the optical device 1C is formed thereby. As with the first embodiment, the numerical values, etc., of the above-described manufacturing process are those of one example.

Actions and effects of the optical device 1C shall now be described. When an optical pulse, for example, with a time width of 100 femtoseconds and a central wavelength of 800 nm, is made incident as an excitation light onto the THz wave generating portion 60, the THz wave generating portion 60 generates and outputs the THz waves 40 of the wavelength λ1. The THz waves 40 thus output propagate through the semiconductor layer 50 and become incident on the waveguide 20.

By the incidence of the THz waves 40 of the wavelength λ1, surface plasmon resonance occurs in the periodic structure portions 25B with the uneven pattern 26, and excitation of surface plasmon waves (propagated in direction 100) occurs. As in the optical device 1B, the surface plasmon waves (propagated in direction 100) generated in the periodic structure portions 25B propagate toward the aperture 24 via the plurality of intersecting regions 22a and become focused to the aperture 24 with the width narrower than the wavelength λ1. The surface plasmon waves (propagated in direction 100) that are focused to the aperture 24 become, for example, scattered at the boundary of the aperture 24 and the waveguide 20, and become reconverted into THz waves 41, which have the same oscillation frequency as the surface plasmon waves (propagated in direction 100), propagate through the semiconductor substrate 10, and become output from the rear surface 12.

With the optical device 1C, because the surface plasmon waves (propagated in direction 100) generated by the THz waves 40 output from the THz wave generating portion 60 become focused to the aperture 24 and become output from the semiconductor substrate 10 side upon reconversion into the THz waves 41, the THz waves 41 of high energy density can be generated. Because, as in the optical devices 1A and 1B, the waveguide 20 functions as the waveguide structure for the surface plasmon waves (propagated in direction 100) in the optical device 1C as well, the surface plasmon waves (propagated in direction 100) can be made to propagate over a longer distance. Because the efficiency of focusing of the surface plasmon waves (propagated in direction 100) to the aperture 24 is thus improved, the energy density of the THz waves 41 output from the optical device 1C is improved further. Also because a quantum well structure is employed to excite and propagate the surface plasmon waves (propagated in direction 100), the optical device 1C can be manufactured easily. Furthermore, because the area occupied by the waveguide 20 can be made small, high density integration is enabled for forming an array.

Although with the optical device, the semiconductor layer 50 is disposed above the waveguide 20, the THz wave generating portion 60 may instead be disposed directly on the semiconductor substrate 10 exposed from the aperture 24 of the waveguide 20.

Fourth Embodiment

Figure 15:
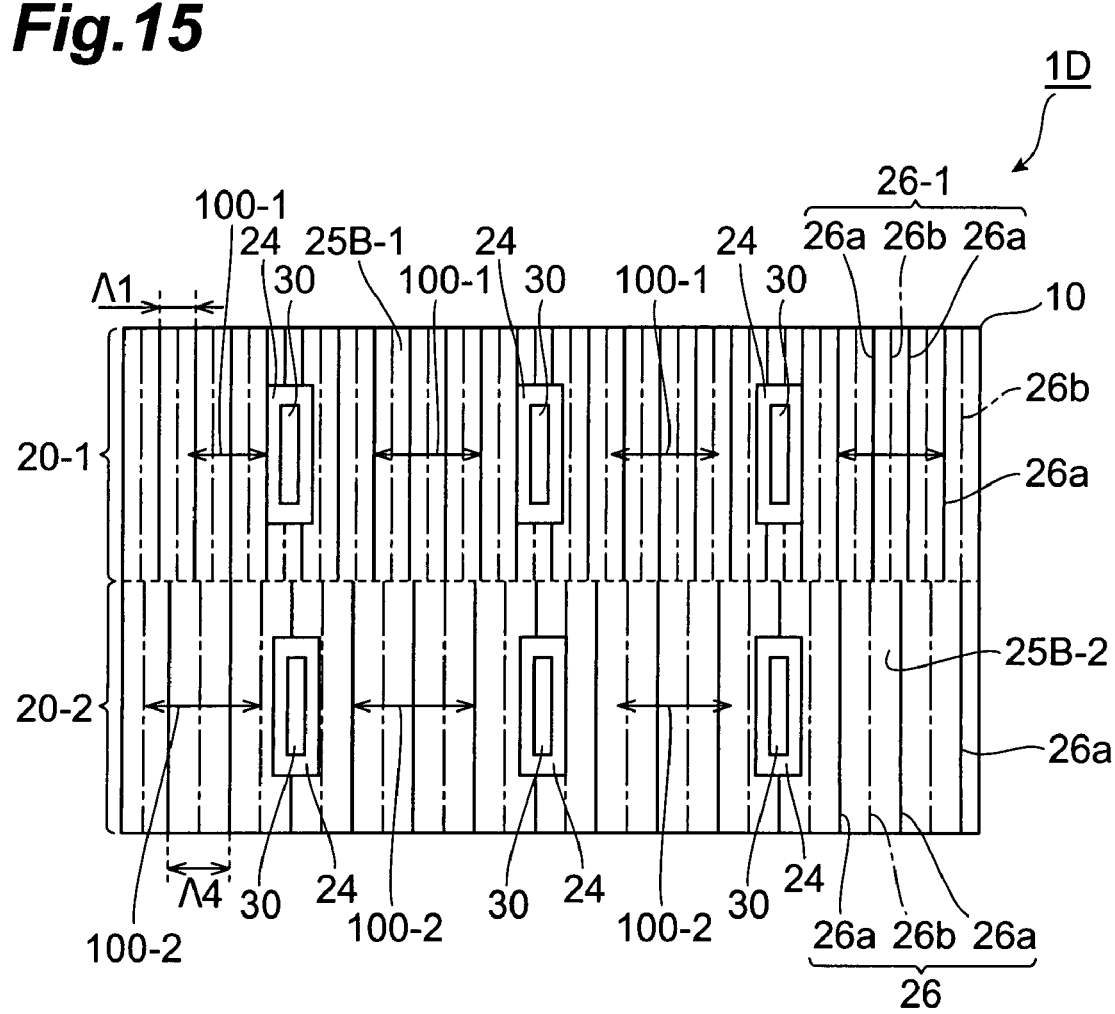
FIG. 15 is a plan view of a fourth embodiment of an optical device according to the present invention.

FIG. 15 is a plan view of a fourth embodiment of an optical device according to the present invention. Main differences of the optical device 1D with respect to the optical device 1B of the second embodiment in terms of the arrangement are that a plurality (two in FIG. 15) of waveguides 20-1 and 20-2 are disposed in parallel on the top surface 11 of the semiconductor substrate 10 and respective periodic uneven patterns 26-1 and 26-2 of the waveguides 20-1 and 20-2 have different periods Λ1 and Λ4. The optical device 1D shall now be described mainly in regard to this point. In FIG. 15, the wave receiving portions 30 above the apertures 24 are illustrated schematically.

Besides a plurality (three in FIG. 4) of the apertures 24 being formed one-dimensionally, the arrangement of the waveguide 20-1 is the same as the arrangement of the waveguide 20. That is, the waveguide 20-1 has the quantum well structure constituted by the clad layer 21, the quantum well layer 22, and the clad layer 23 being laminated from the semiconductor substrate 10 side. The waveguide 20-1 has the uneven pattern 26-1 with the period Λ1 in the X-axis direction and has a substantially triangular-wave-like cross-sectional shape in the XZ plane. Because a plan view is shown in FIG. 15, symbols are provided for one period of the uneven pattern 26-1 for the sake of convenience. The same shall apply below when illustrating an uneven pattern by a plan view.

With the optical device 1D, the period Λ1 of the uneven pattern 26-1 is determined so as to give rise to surface plasmon waves (propagated in direction 100-1) in accordance with THz waves of the wavelength λ1. With the waveguide 20-1, a region surrounding the respective apertures 24 is a periodic structure portion (waveguide structure) 25B-1. The wave receiving portion 30 is disposed above each aperture 24 formed in the waveguide 20-1.

Besides the period Λ4 of the uneven pattern 26-2 along the X-axis direction differing from the period Λ1 of the uneven pattern 26-1 of the waveguide 20-2, the arrangement of the waveguide 20-2 is the same as the arrangement of the waveguide 20-1. The period Λ4 of the uneven pattern 26-2 is determined so as to give rise to surface plasmon waves (propagated in direction 100-2) in accordance with THz waves of a wavelength λ4 that differs from the wavelength λ1. Also in the waveguide 20-2, a region surrounding the apertures 24 is a periodic structure portion 25B-2.

Actions and effects of the optical device 1D shall now be described. Here, a description shall be provided for a case where THz waves of a wavelength range that includes the different wavelengths λ1 and λ4 are made incident from the rear surface 12 of the semiconductor substrate 10.

When the THz waves are made incident from the rear surface 12 of the semiconductor substrate 10 of the optical device 1D and become incident on the uneven patterns 26-1 and 26-2, the surface plasmon waves (propagated in direction 100-1) are generated at the uneven pattern 26-1 side by the THz waves of the wavelength λ1 and the surface plasmon waves (propagated in direction 100-2) are generated at the uneven pattern 26-2 side by the THz waves of the wavelength λ4. The surface plasmon waves (propagated in direction 100-1 and 100-2), generated at the uneven patterns 26-1 and 26-2, are focused to the apertures 24 respectively formed in the waveguides 20-1 and 20-2 and are detected in the same manner as in the optical devices 1A and 1B by the light receiving portions 30 disposed on the respective apertures 24.

With the optical device 1D, because the periods Λ1 and Λ4 of the uneven patterns 26-1 and 26-2 differ, the wavelengths λ1 and λ4 detected by the waveguides 20-1 and 20-2 differ. Consequently with the optical device 1D, THz waves can be detected upon wavelength decomposition (in other words, upon spectral separation).

Also, because the waveguides 20-1 and 20-2 have the uneven patterns 26-1 and 26-2, the optical device 1D exhibits the same actions and effects as the optical devices 1A and 1B. That is, the waveguides 20-1 and 20-2 function as waveguide structures for surface plasmon waves (propagated in direction 100) and enables propagation of the surface plasmon waves (propagated in direction 100-1 and 100-2) over longer distances. Because the efficiencies of focusing of the surface plasmon waves (propagated in direction 100-1 and 100-2) to the respective apertures 24 are thereby improved, THz waves can be detected efficiently and at high sensitivity. Also, due to employment of the quantum well structure, the optical device 1D can be manufactured easily. Furthermore, because the areas occupied by the waveguides 20-1 and 20-2 can be made small, high density integration is enabled.

Although the optical device 1D has light receiving portions 30 disposed at the respective apertures 24 and is thereby arranged as a THz wave light receiving element, in a case where the light receiving portions 30 are not provided, the optical device can be used as a spectroscopic element. Also, although two waveguides 20-1 and 20-2 are disposed on the semiconductor substrate 10 here, three or more waveguides 20-1 to 20-$n$ (n is an integer no less than 3) may be provided as described above. In a case where three or more waveguides 20-1 to 20-$n$ are provided, it suffices that at least the uneven patterns 26-$n$ and 26-$m$ of two waveguides 20-$n$ and 20-$m$ (m and n are different integers no less than 3) differ in period.

Fifth Embodiment

Figure 16:
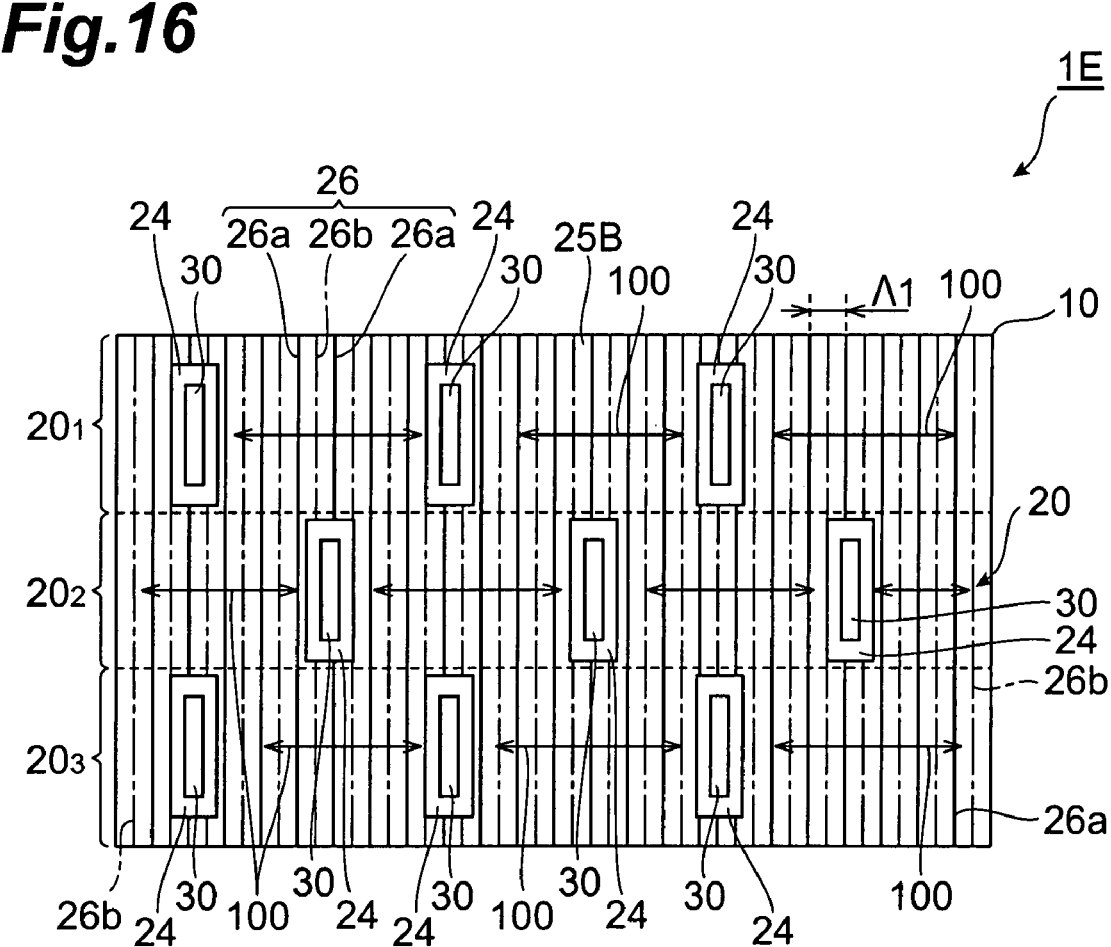
FIG. 16 is plan view of a fifth embodiment of an optical device according to the present invention.

FIG. 16 is plan view of a fifth embodiment of an optical device according to the present invention. A difference in terms of arrangement of the optical device 1E with respect to the optical device 1B of the second embodiment is that a plurality of the apertures 24 are formed two-dimensionally on the waveguide 20 laminated on the semiconductor substrate and each aperture 24 is provided with the light receiving portion 30. In FIG. 16, the light receiving portions 30 are illustrated schematically.

With the optical device 1E, when THz waves of the wavelength λ1 are made incident from the rear surface 12 of the semiconductor substrate 10, surface plasmon waves (propagated in direction 100) are generated by the uneven pattern 26 of the waveguide 20 in the same manner as in the optical device 1B. The generated surface plasmon waves (propagated in direction 100) are focused to each aperture 24 via the plurality of intersecting regions 22$a$ and detected by each wave receiving portion 30 in the same manner as in the optical devices 1A and 1B. The THz waves of the wavelength λ1 made incident onto the semiconductor substrate 10 can thus be detected.

With the optical device 1E, the plurality of apertures 24 are positioned two-dimensionally to provide a multi-channel arrangement that enables acquisition of a two-dimensional spatial image of THz waves.

Due to the employment of the waveguide 20, having the intersecting regions 22$a$, the optical device 1E exhibits the same actions and effects as the optical devices 1A and 1B. That is, with the optical device 1E, because the waveguide 20 has the intersecting regions 22$a$, the waveguide 20 acts as a waveguide structure for the surface plasmon waves (propagated in direction 100). Due to the employment of the quantum well structure, the waveguide 20 enables the surface plasmon waves (propagated in direction 100) to be propagated over a longer distance. Because the efficiencies of focusing of the surface plasmon waves (propagated in direction 100) to the apertures 24 are thereby improved, THz waves can be detected efficiently and at high sensitivity. Also, due to employing the quantum well structure for excitation and propagation of the surface plasmon wave (propagated in direction 100), the optical device 1E can be manufactured easily.

If the waveguide 20 of the optical device 1E is considered as being divided into a plurality (three in FIG. 16) of regions as indicated by the broken lines in FIG. 16, the optical device 1E can be considered as an arrangement having a plurality of waveguides $20_1$, $20_2$, and $20_3$ disposed on the semiconductor substrate 10 and having the plurality of apertures 24 formed one-dimensionally in the waveguides $20_1$, $20_2$, and $20_3$. Because the areas occupied by the waveguides $20_1$, $20_2$, and $20_3$ can be made small in this case as well, high density integration is enabled. The uneven patterns 26 of the waveguides $20_1$, $20_2$, and $20_3$ in the optical device 1E have the same period Λ1. The broken lines in FIG. 16 are drawn for the sake of convenience of the above description.

Sixth Embodiment

Figure 17:
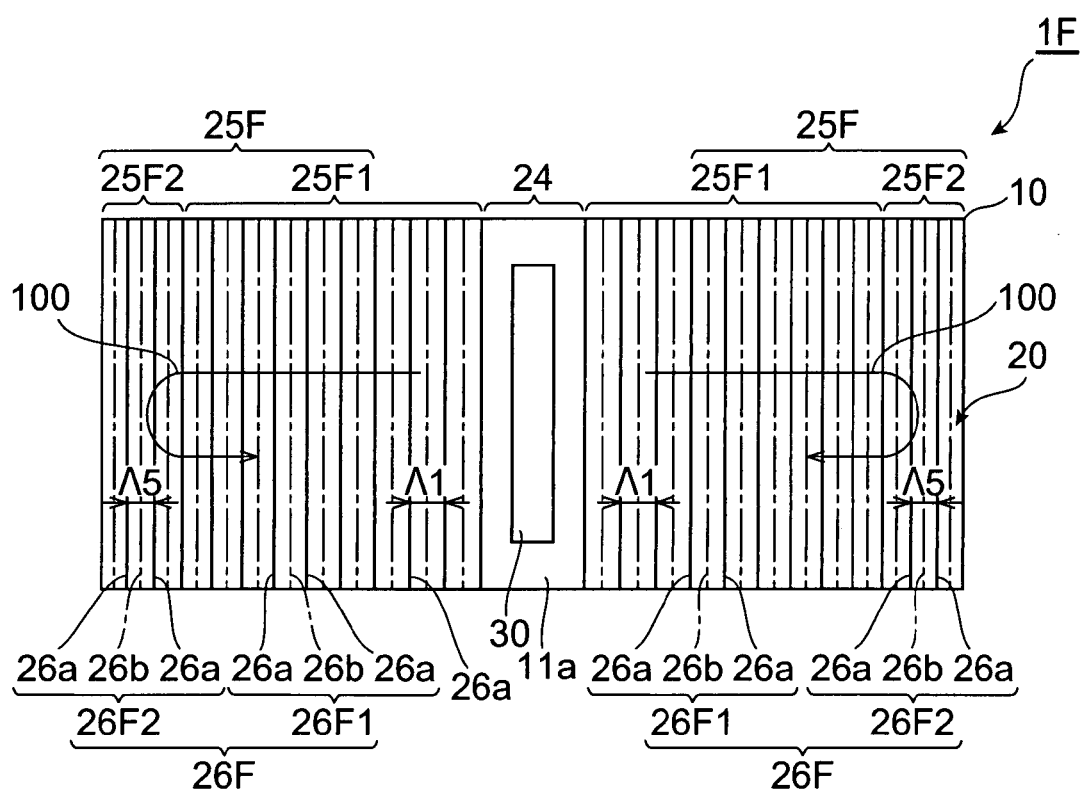
FIG. 17 is plan view of a sixth embodiment of an optical device according to the present invention.

FIG. 17 is plan view of a sixth embodiment of an optical device according to the present invention. A main difference in terms of arrangement of the optical device 1F with respect to the optical device 1B of the second embodiment is that an uneven pattern 26F (surface plasmon wave generating portion) of the waveguide 20 laminated on the semiconductor substrate 10 is constituted of a first uneven pattern 26F1 and a second uneven pattern 26F2, which differ in period.

As with the waveguide 20 of the second embodiment, the waveguide 20 of the optical device 1F is a quantum well structure arranged by laminating the clad layer 21, the quantum well layer 22, and the clad layer 23 onto the semiconductor substrate 10. The waveguide 20 has the aperture 24 and has periodic structure portions 25F, with the uneven pattern 26F, disposed at both sides of the aperture 24. As in the case of the periodic structure portions 25A and 25B, the cross-sectional shape in the XZ plane of each periodic structure portion 25F is a substantially triangular-wave-like shape.

Because the uneven pattern 26F is constituted of uneven patterns 26F1 and 26F2 that differ in period, each periodic structure portion 25F has a first periodic structure portion 25F1, with the uneven pattern 26F1, and a second periodic structure portion 25F2, with the uneven pattern 26F2. In the X-axis direction, the first periodic structure portion 25F1 and the second periodic structure portion 25F2 are disposed in the order of the first periodic structure portion 25F1 and the second periodic structure portion 25F2 from the aperture 24 side. The second periodic structure portion 25F2 is thus positioned at the side opposite the aperture 24 side with respect to the first periodic structure portion 25F1. Here, it can be said the waveguide 20 of the optical device 1F is arranged by forming the aperture 24 in the first uneven pattern 26F1 in the waveguide 20, in which the second uneven patterns 26F2 have been formed at both sides of the first uneven pattern 26F1.

As in the second embodiment, a period Λ1 of the first uneven pattern 26F1 is determined so that the surface plasmon waves (propagated in direction 100) are generated when THz waves, having the wavelength λ1 as the predetermined wavelength, are made incident. Each first periodic structure portion 25F1 thus functions as a surface plasmon wave generating portion. A period Λ5 of the second uneven pattern 26F2 is half the period Λ1 of the first uneven pattern 26F1 (Λ1/2). Thus when the surface plasmon waves (propagated in direction 100) generated in the first periodic structure portion 25F1 are guided to the second periodic structure portion 25F2 via the plurality of intersecting regions 22a, the surface plasmon waves (propagated in direction 100) are reflected toward the aperture 24 side. Each second periodic structure portion 25F2 thus functions as a DFB portion that gives to rise to so-called DFB (Distributed Feedback).

With the optical device 1F, because the first periodic structure portion 25F1 functions as the surface plasmon wave generating portion, the surface plasmon waves (propagated in direction 100) are generated upon incidence of the THz waves of the wavelength λ1 from the rear surface of the optical device 1F. The surface plasmon waves (propagated in direction 100) are focused to the aperture 24 upon propagating in the X-axis direction via the plurality of intersecting regions 22a of the quantum well layer 22.

As shown in FIG. 17, a portion of the surface plasmon waves (propagated in direction 100) may propagate toward the sides opposite the aperture 24 side. With the optical device 1F, because the periodic structure portions 25F2 are positioned at the sides opposite the aperture 24 side, the surface plasmon waves that propagate toward the sides opposite the aperture 24 side are reflected by the second uneven patterns 26F2 toward the aperture 24. More of the surface plasmon waves (propagated in direction 100) generated at the first periodic structure portions 25F1 can thus be focused to the aperture 24 and the energy density at the aperture 24 is made even higher. The THz waves made incident on the semiconductor substrate 10 can thus be detected efficiently and at high sensitivity.

Also with the optical device 1F, because the waveguide 20 is a quantum well structure and the first and second uneven patterns 26F1 and 26F2 can be formed readily, the manufacture of the optical device 1F is easy. Also because the THz waves made incident on the optical device 1F are converted into the surface plasmon waves (propagated in direction 100) that are propagated and focused to the aperture 24 using the plurality of intersecting regions 22a and are thereafter detected by the wave receiving portion 30, the THz waves can be detected at a high energy density. As a result, the THz waves can be detected efficiently and at high sensitivity. Furthermore, because the quantum well structure, with which the impurity and the carrier movement space are separated spatially, is employed, the surface plasmon waves (propagated in direction 100) can be made to propagate over longer distances, thereby improving the efficiency of focusing to the aperture 24.

Although embodiments of the waveguide structure and the optical device according to the present invention have been described above, the present invention is not restricted to the above-described embodiments. For example, the shape of the uneven pattern of the waveguide 20 equipped in each of the optical devices 1A to 1F can be modified variously. Modification examples of the uneven pattern shall now be described with reference to FIGS. 18 to 24C.

Figure 18:
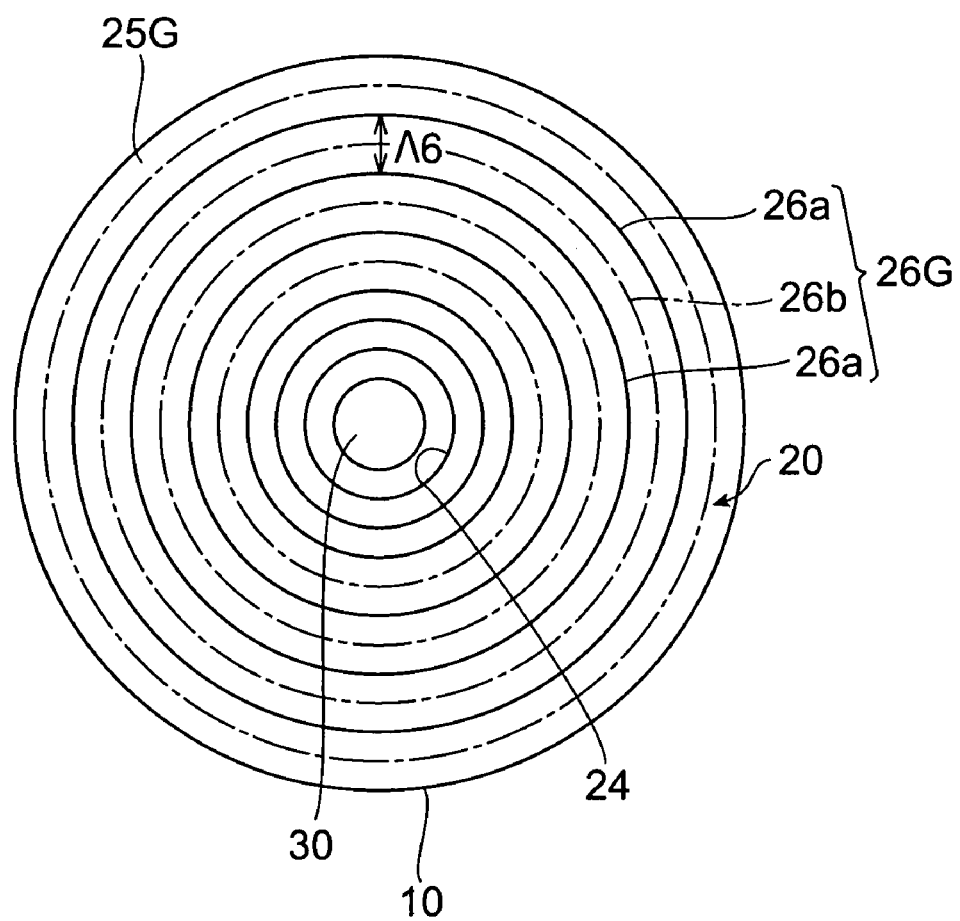
FIG. 18 is a plan view of a quantum well structure having an uneven pattern according to a first modification example.

FIG. 18 is a plan view of a waveguide with an uneven pattern according to a first modification example. FIG. 18 shows a case where the uneven pattern 26G (surface plasmon wave generating portion) is applied to an optical device that is a THz wave receiver, such as the optical device 1A or 1B. The wave receiving portion 30 is illustrated schematically.

As shown in FIG. 18, the uneven pattern 26G has an annular shape as viewed from above, and the cross-sectional shape along a radial direction is a substantially triangular-wave-like shape like that of the uneven pattern 26 of the optical device 1B. The waveguide 20 thus has a plurality of intersecting regions 22a. Because the waveguide 20 has the intersecting regions 22a, the waveguide 20 functions as a waveguide structure that propagates surface plasmon waves (propagated in direction 100). With the waveguide 20 to which the uneven pattern 26G is applied, a circular aperture 24 (focusing portion) is formed at a central portion and a periphery of the aperture is a periodic structure portion 25G having the uneven pattern 26G. The diameter of the aperture 24 is preferably smaller than the wavelength of THz waves having the same oscillation frequency as the surface plasmon waves (propagated in direction 100) that propagate through the waveguide 20. Also, by determining a period Λ6 in the radial direction of the uneven pattern 26G so that surface plasmon resonance occurs upon incidence of THz waves of a predetermined wavelength (for example, the wavelength λ1), the uneven pattern 26G can be made to function as a surface plasmon wave generating portion.

Figure 19:
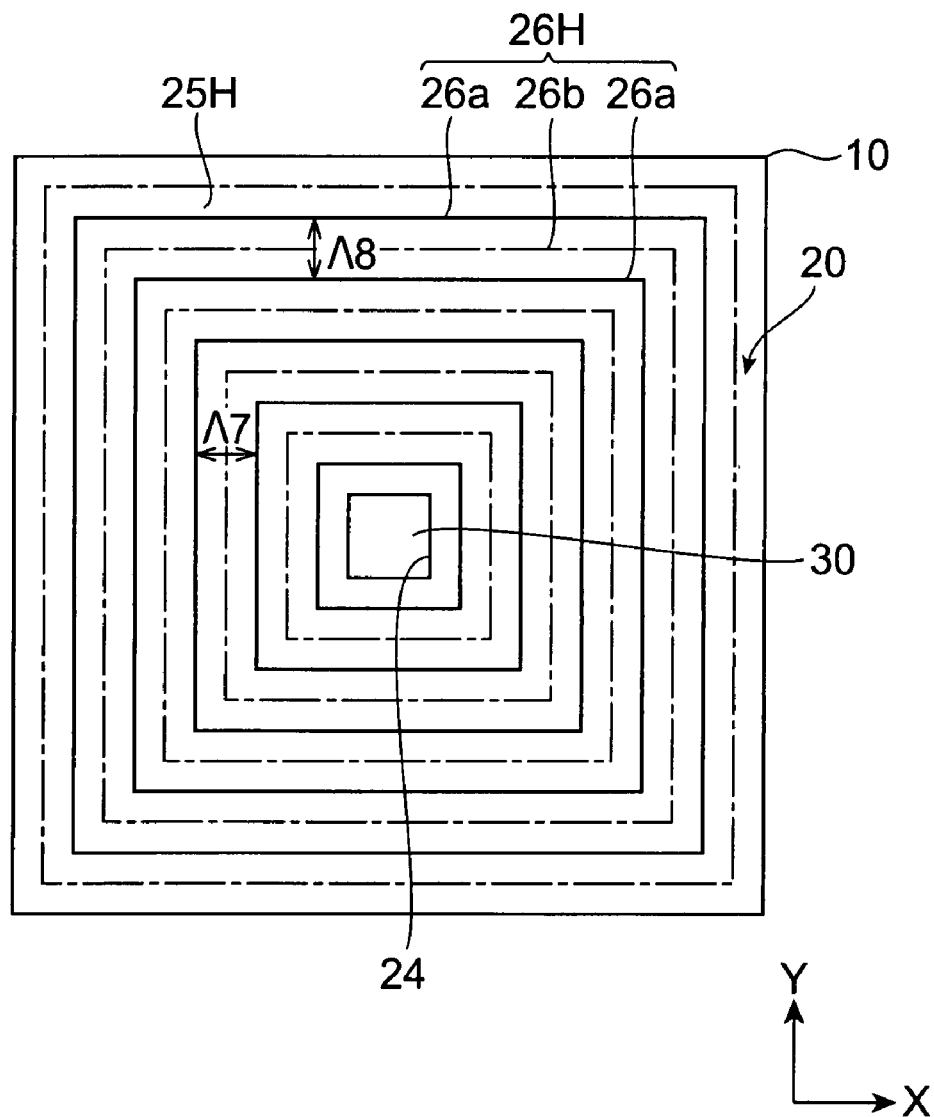
FIG. 19 is a plan view of a quantum well structure having an uneven pattern according to a second modification example.

FIG. 19 is a plan view of a waveguide to which an uneven pattern according to a second modification example is applied. FIG. 19 shows a case where the uneven pattern 26H (surface plasmon wave generating portion) is applied to an optical device that is a THz wave receiver, such as the optical device 1A or 1B. The wave receiving portion 30 is illustrated schematically.

As shown in FIG. 19, the uneven pattern 26H has a square shape as viewed from above, and the cross-sectional shape along each of the X-axis direction and the Y-axis direction (in other words, the cross-sectional shape in each of the XZ plane and the YZ plane) is a substantially triangular-wave-like shape like that of the uneven pattern 26 of the optical device 1B. Because the waveguide 20 thus has a plurality of continuous intersecting regions 22a in this case as well, it functions as a waveguide structure that propagates surface plasmon waves (propagated in direction 100). With the waveguide 20 to which the uneven pattern 26H is applied, a square aperture 24 is formed at a central portion and a periphery of the aperture is a periodic structure portion 25H having the uneven pattern 26H. The length of one side of the aperture 24 is preferably smaller than the wavelength of THz waves having the same oscillation frequency as the surface plasmon waves (propagated in direction 100) that propagate through the waveguide 20.

Because the uneven pattern 26H has a square shape as described above, the period Λ7 in the X-axis direction and the period Λ8 in the Y-axis direction of the uneven pattern 26H are the same. By determining the periods Λ7 and Λ8 of the uneven pattern 26H so that surface plasmon resonance occurs upon incidence of THz waves of a predetermined wavelength (for example, the wavelength λ1), the uneven pattern 26H can be made to function as a surface plasmon wave generating portion. The shape of the uneven pattern 26H as viewed from above may, for example, be a rectangular shape instead.

Figure 20A:
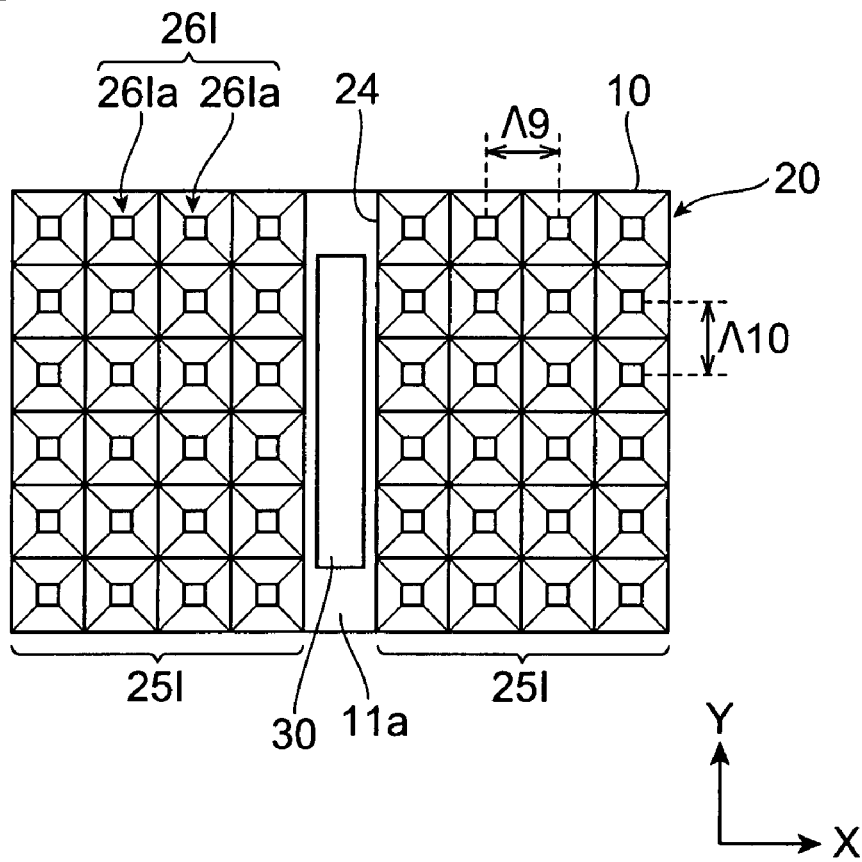
FIG. 20A shows a plan view of a quantum well structure having an uneven pattern according to a third modification example.
Figure 20B:
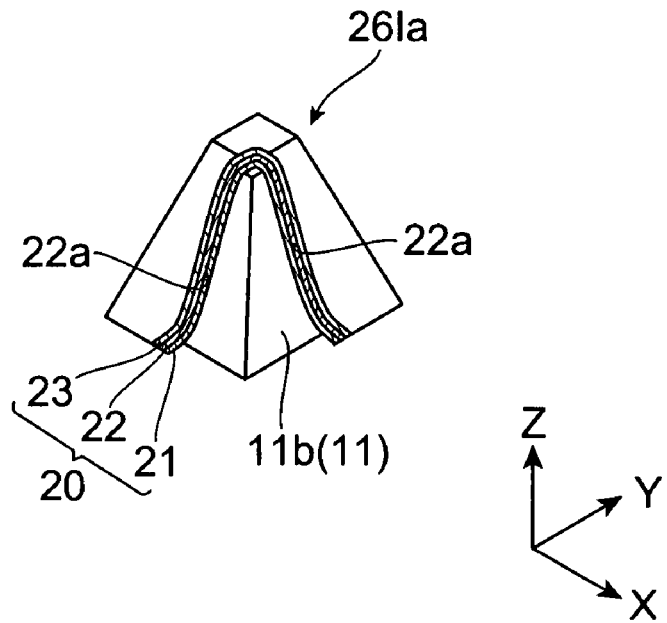
FIG. 20B shows a partially enlarged view of FIG. 20A.

FIGS. 20A and 20B show plan views of a quantum well structure to which an uneven pattern according to a third modification example is applied and an enlarged perspective view of a portion of the same. FIGS. 20A and 20B show a case where the uneven pattern 26I (surface plasmon wave generating portion) is applied to an optical device that is a THz wave receiver, such as the optical device 1A or 1B. The wave receiving portion 30 is illustrated schematically in FIG. 20A.

The uneven pattern 26I has a plurality of pyramidal raised portions 26Ia and these are positioned periodically in the X-axis direction and the Y-axis direction. With the uneven pattern 26I, intervals (periods) Λ9 and Λ10 of adjacent raised portions 26I in the X-axis direction and the Y-axis direction are the same. With the waveguide 20 to which the uneven pattern 26I is applied, the aperture 24 is formed in a central portion and a periphery of the aperture is a periodic structure portion 25I having the uneven pattern 26I.

With the waveguide 20 having the uneven pattern 26I, each of the quantum well layer 22 regions that constitute the four side surface portions forming each raised portion 26Ia is an intersecting region 22a that intersects the XY plane. Because the waveguide 20 has the intersecting regions 22a, the waveguide 20 functions as a waveguide structure for surface plasmon waves. Also, adjacent side surface portions in each raised portion 26Ia are continuous and because these are furthermore continuous with side surface portions of adjacent raised portions 26Ia, the plurality of intersecting regions 22a are continuous. As a result, surface plasmon waves can be made to propagate in the X-axis direction and the Y-axis direction.

Also, by forming the periods Λ9 and Λ10 so that surface plasmon resonance occurs upon incidence of THz waves of a predetermined wavelength (for example, the wavelength λ1), the uneven pattern 26I can be made to function as a surface plasmon wave generating portion. The periods Λ9 and Λ10 may differ. Also, although a top portion of each raised portion 26Ia is flat as shown in FIG. 20B, each raised portion 26Ia may be formed to a triangular pyramidal shape instead.

Figure 21A:
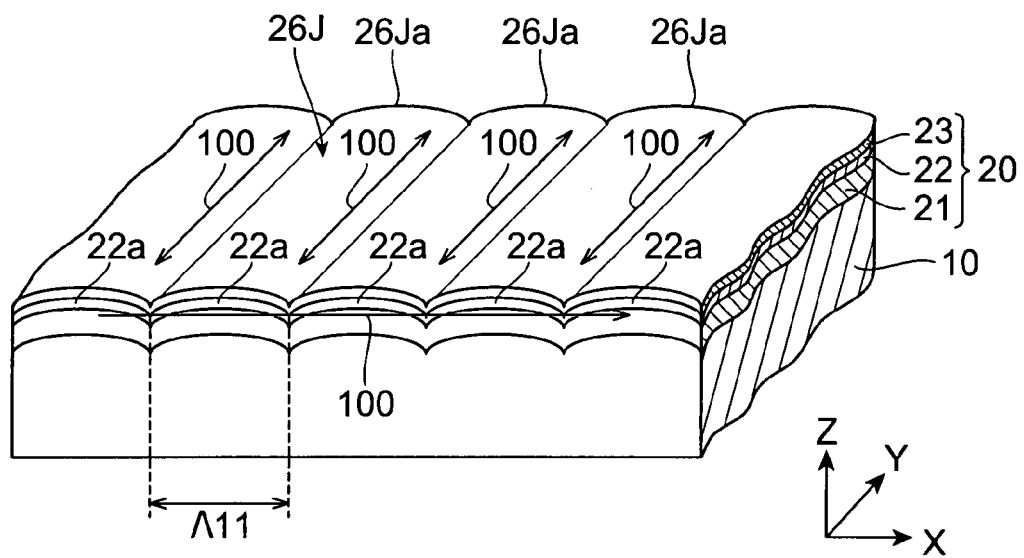
FIGS. 21A and 21B show perspective views of quantum well structures having uneven patterns according to fifth and sixth modification examples.
Figure 21B:
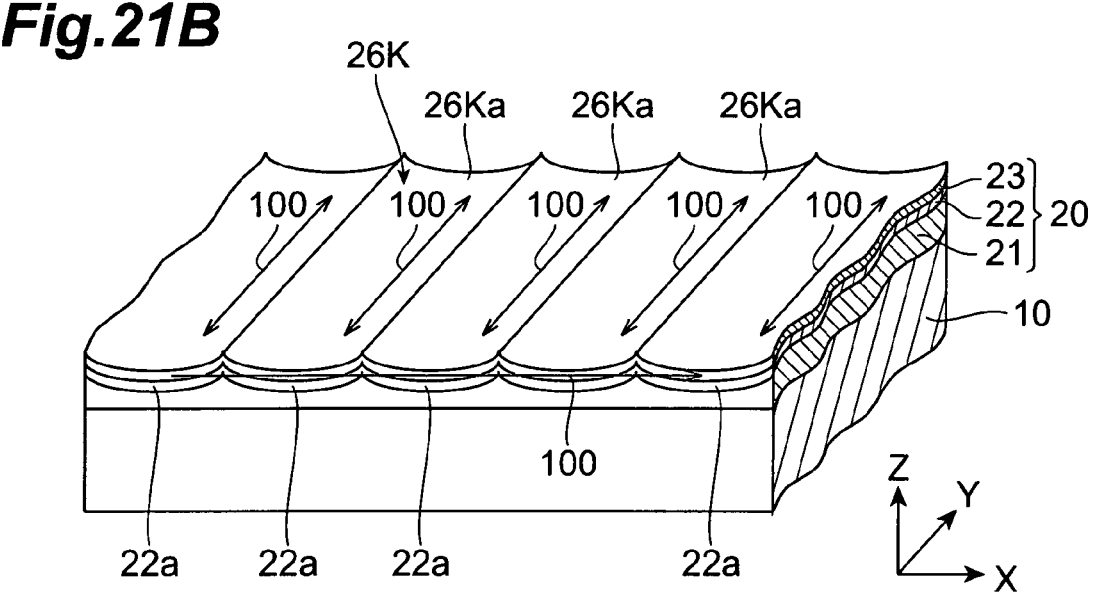

FIGS. 21A and 21B show perspective views of waveguides having uneven patterns according to fifth and sixth modification examples. FIGS. 21A and 21B show states in which the waveguides 20, having the uneven patterns according to the fifth and sixth modification examples, are laminated onto the semiconductor substrates 10.

As shown in FIG. 21A, the uneven pattern 26J (surface plasmon wave generating portion) is arranged by curved portions 26Ja, each of which is curved toward the side opposite the semiconductor substrate 10, being disposed continuously in the X-axis direction. The quantum well layer 22 that constitutes a portion of each curved portion 26J becomes the intersecting regions 22 that intersect the XY plane. The waveguide 20 thus functions as a waveguide structure that enables propagation of surface plasmon waves (propagated in direction 100). With the waveguide 20 having the uneven pattern 26J, because the intersecting regions 22a are continuous in the X-axis direction, the surface plasmon waves (propagated in direction 100) propagate in the alignment direction of the curved portions 26Ja (the X-axis direction shown in FIGS. 21A and 21B) and also in the direction of extension of the curved portions 26Ja (the Y-axis direction shown in FIGS. 21A and 21B).

In this case, each connecting portion between adjacent curved portions 26Ja becomes a valley portion 26b as shown in FIG. 21A, and the valley portions 26b are disposed periodically. By determining a distance Λ11 between the valley portions 26b so that surface plasmon resonance occurs upon incidence of THz waves of a predetermined wavelength, the uneven pattern 26J can be made to function as a surface plasmon wave generating portion.

As shown in FIG. 21B, the uneven pattern 26K (surface plasmon wave generating portion), which is the sixth modification example, is arranged by curved portions 26Ka, each of which is curved toward the semiconductor substrate 10, being disposed continuously in the X-axis direction. Besides the direction of curvature of the curved portions 26Ka differing from the direction of curvature of the curved portions 26Ja of the uneven pattern 26J, shown in FIG. 21A, the arrangement is the same as that of the uneven pattern 26J. The waveguide 20 having the uneven pattern 26K thus also functions as a waveguide structure and the uneven pattern 26K can also be made to function as a surface plasmon wave generating portion.

As shown in FIG. 21B, with the uneven pattern 26K, a top surface (interface with the quantum well layer 22) of the clad layer 21, which is a portion of the waveguide 20, is curved, and the quantum well layer 22 and the clad layer 23 are laminated onto the clad layer 21, and the uneven pattern 26K may be formed by laminating the clad layer 21, the quantum well layer 22, and the clad layer 23 after forming the second regions 11b of the semiconductor substrate 10 to the shapes of the curved portions 26Ka.

Figure 22:
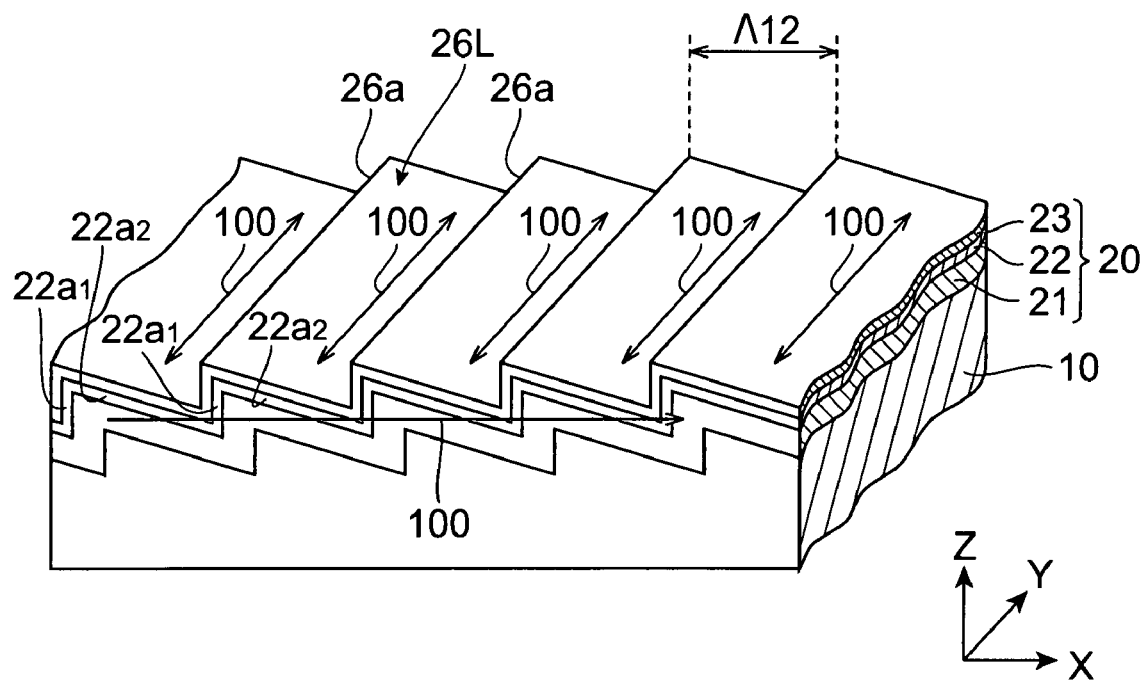
FIG. 22 is a perspective view of a quantum well structure having an uneven pattern according to a seventh modification example.

FIG. 22 is a perspective view of a waveguide having an uneven pattern according to a seventh modification example. FIG. 22 shows a state in which the waveguide, having the uneven pattern 26L (surface plasmon wave generating portion) of the seventh modification example, is laminated onto the semiconductor substrate 10.

The uneven pattern 26L is a Fresnel lens type pattern. With this arrangement, because the quantum well layer 22 has a plurality of intersecting regions $22a_1$, which are substantially orthogonal to the XY plane, and intersecting regions $22a_2$, which intersect the XY plane at a predetermined angle, the waveguide 20 functions as a waveguide structure that propagates surface plasmon waves (propagated in direction 100). Also, because the intersecting regions $22a_1$ and the intersecting regions $22a_2$ are disposed alternately and continuously, the surface plasmon waves (propagated in direction 100) propagate in the X-axis direction and the Y-axis direction in FIG. 22. By determining a period Λ12 of the uneven pattern 26L so that surface plasmon resonance occurs upon incidence of THz waves of a predetermined wavelength (for example, the wavelength λ1), the uneven pattern 26L can be made to function as a surface plasmon wave generating portion. An optical device having the waveguide 20, to which such a Fresnel lens type uneven pattern 26L is applied, can also be used favorably as a focusing lens.

Figure 23:
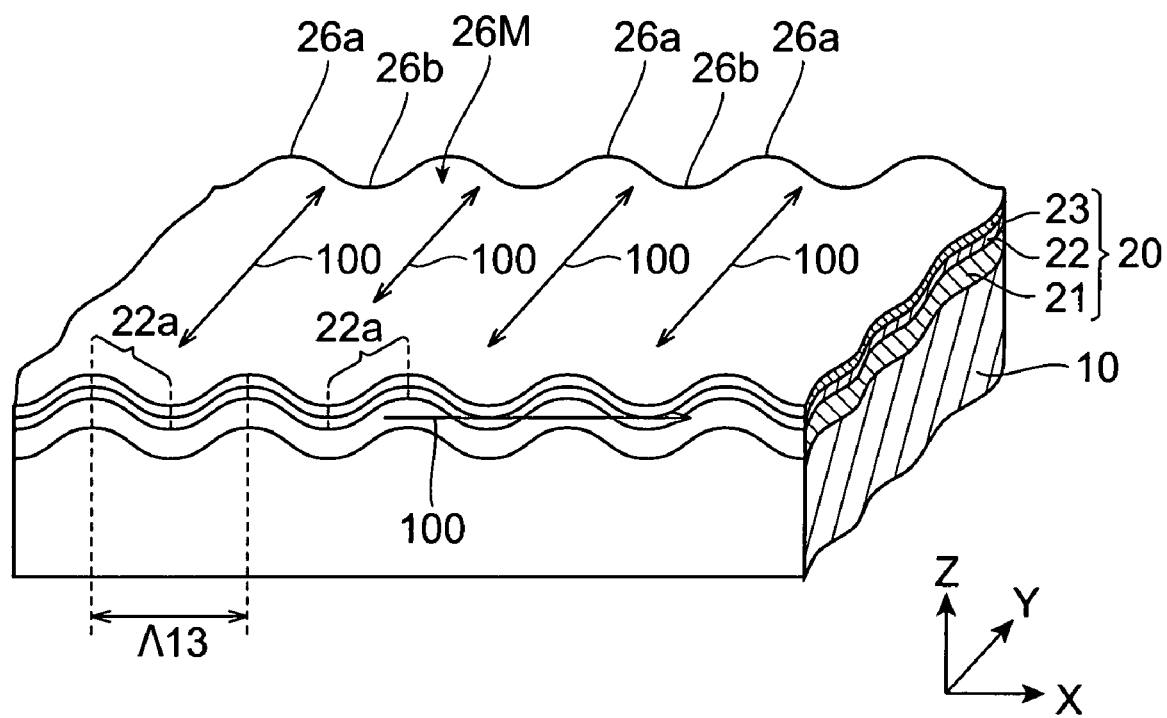
FIG. 23 is a perspective view of a quantum well structure having an uneven pattern according to an eighth modification example.

FIG. 23 is a perspective view of a waveguide with an uneven pattern according to an eighth modification example. FIG. 23 shows a state in which the waveguide 20, having the uneven pattern 26M (surface plasmon wave generating portion) according to the eighth modification example, is laminated onto the semiconductor substrate 10.

As shown in FIG. 23, the cross-sectional shape of the uneven pattern 26M according to the eighth modification example is sinusoidal. With this arrangement, the quantum well layer 22 also has the uneven pattern 26M and, for example, half-period regions of a sine wave correspond to being the intersecting regions 22a. Because the waveguide 20 has the intersecting regions 22a, the waveguide 20 functions as a waveguide structure that propagates surface plasmon waves. Also, because the quantum well layer 22 has the plurality of intersecting regions 22a and the plurality of intersecting regions 22a are continuous, the surface plasmon waves (propagated in direction 100) propagate in the X-axis direction and the Y-axis direction. By determining a period Λ13 of the uneven pattern 26M so that surface plasmon resonance occurs upon incidence of THz waves of a predetermined wavelength (for example, the wavelength λ1), the uneven pattern 26M can be made to function as a surface plasmon wave generating portion.

Figure 24A:
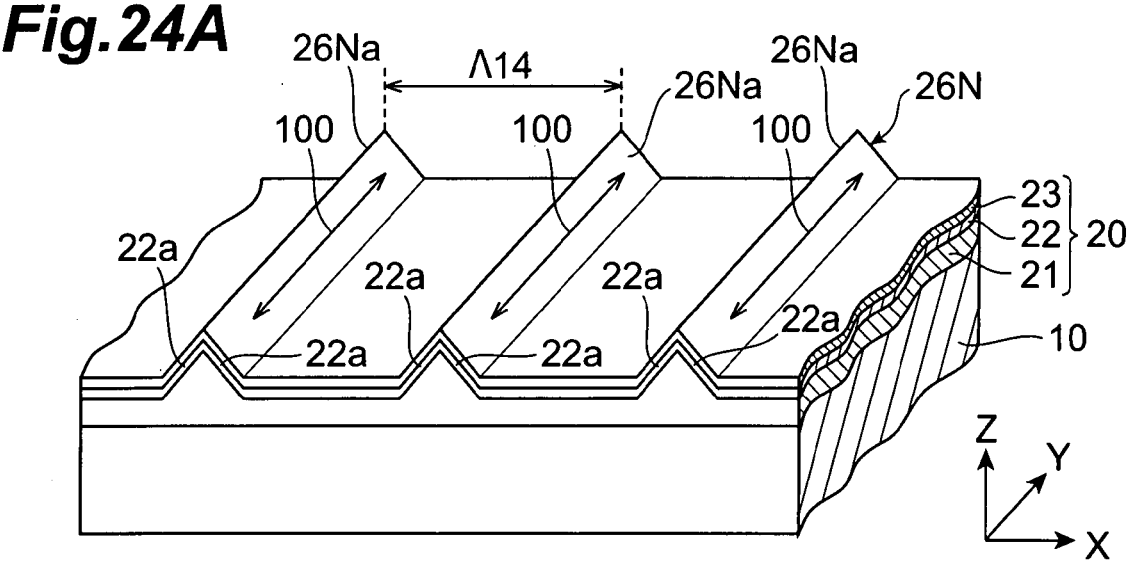
FIGS. 24A, 24B, and 24C show perspective views of quantum well structures having uneven patterns according to ninth to eleventh modification examples.
Figure 24B:
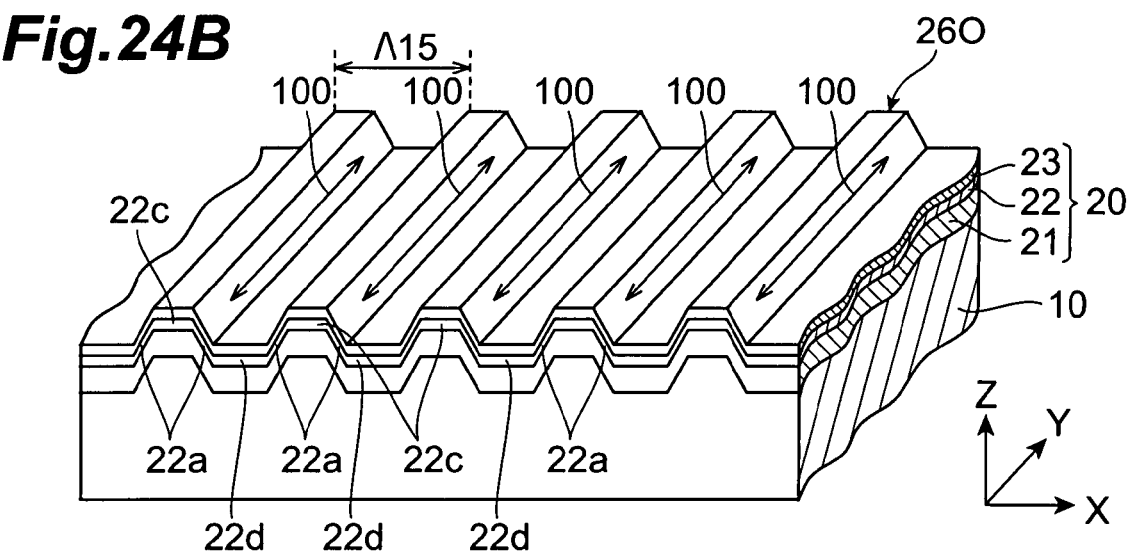
Figure 24C:
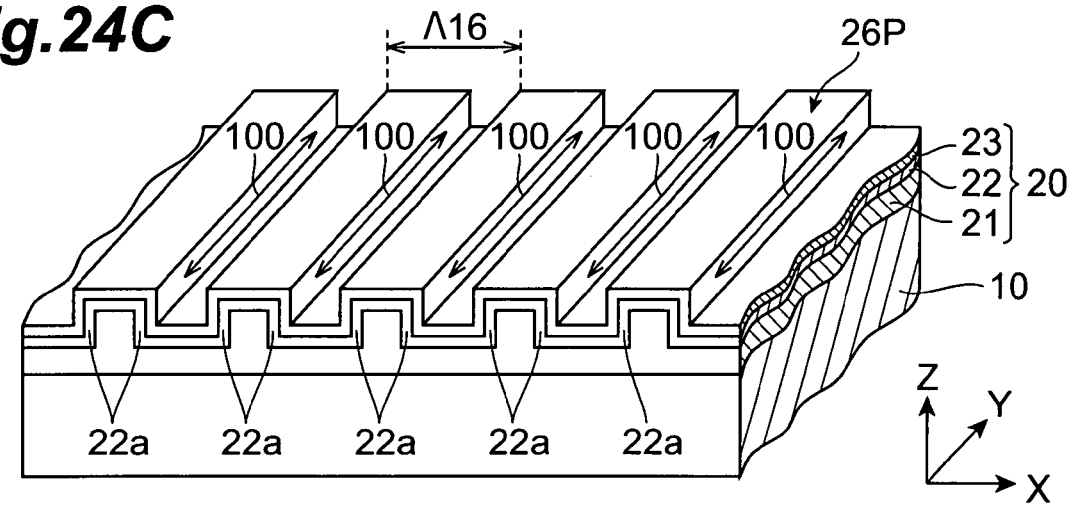

FIGS. 24A to 24C show perspective views of waveguides having uneven patterns according to ninth to eleventh modification examples. FIGS. 24A to 24C show states in which the waveguides 20, respectively having the uneven patterns 26N, 26O, and 26P (surface plasmon wave generating portions) according the ninth to eleventh modification examples, are laminated onto the semiconductor substrates 10.

As shown in FIG. 24A, with the uneven pattern 26N according to the ninth modification example, raised portions 26Na, each having a substantially triangular cross-sectional shape in the XZ plane, are disposed apart from each other at a fixed distance. With this arrangement, because the quantum well layer 22, included in a side surface portion of each raised portion 26Na, becomes the intersecting region 22a, the waveguide 20 functions as a waveguide structure that propagates surface plasmon waves (propagated in direction 100). With the waveguide 20 having the uneven pattern 26N, because there are no intersecting regions 22 between the raised portions 26Na, the surface plasmon waves (propagated in direction 100) propagate in the Y-axis direction.

Thus with an optical device having the waveguide 20 with the uneven pattern 26N, by providing the aperture 24 so as to be orthogonal to the direction of extension of the raised portions 26Na, the surface plasmon waves (propagated in direction 100) propagating through the intersecting regions 22a can be focused to the aperture 24. Also, by determining a period $\Lambda 14$ of the uneven pattern 26N so that the surface plasmon waves (propagated in direction 100) are generated upon incidence of THz waves of a predetermined wavelength (for example, the wavelength $\lambda 1$), the uneven pattern 26N can be made to function as a surface plasmon wave generating portion.

As shown in FIG. 24B, the cross-sectional shape in the XZ plane of the uneven pattern 26O according to the tenth modification example is a substantially rectangular-wave-like shape. In this case, the quantum well layer 22 of the waveguide 20 has, along the X-axis direction, a plurality of intersecting regions 22a that are inclined with respect to the XY plane. However, adjacent intersecting regions 22a are disposed in a discrete manner and are connected via regions 22c and 22d, which are parallel to the XY plane. As a result, with the waveguide 20, surface plasmon waves (propagated in direction 100) propagate in the Y-axis direction in FIG. 24B. Also, by determining a period $\Lambda 5$ of the uneven pattern 26O so that the surface plasmon waves (propagated in direction 100) are generated with respect to THz waves of a predetermined wavelength, the uneven pattern 26O can be made to function as a surface plasmon wave generating portion.

As shown in FIG. 24C, the cross-sectional shape in the XZ plane of the uneven pattern 26P according to the eleventh modification example is a substantially rectangular-wave-like shape. Besides the intersecting regions 22a of the quantum well layer 22 being substantially orthogonal to the XY plane, the uneven pattern 26B is substantially the same in arrangement as the uneven pattern 26O shown in FIG. 24B. Thus as with the uneven pattern 26O, surface plasmon waves (propagated in direction 100) propagate in the Y-axis direction in FIG. 24C with the waveguide 20. Also, by determining a period $\Lambda 16$ of the uneven pattern 26P so that the surface plasmon waves (propagated in direction 100) are generated with respect to THz waves of a predetermined wavelength, the uneven pattern 26P can be made to function as a surface plasmon wave generating portion.

The first to eleventh modification examples described above can be applied to the optical devices according to the first to sixth embodiment in place of the uneven patterns 26 and 26F that are applied to the respective optical devices. Because THz waves are made incident in a linearly polarized state in many cases, an uneven pattern, having a slit-like shape as viewed from above as in the uneven patterns 26 and 26F applied to the optical devices according to the first to sixth embodiment or having pyramidal raised portions 26Ia as in the uneven pattern 26I according to the third modification example, is preferable.

Although in the description up to now, the periodic uneven pattern (periodic structure) of the waveguide 20 is arranged as a surface plasmon wave generating portion, the surface plasmon wave generating portion can also be modified variously.

Figure 25A:
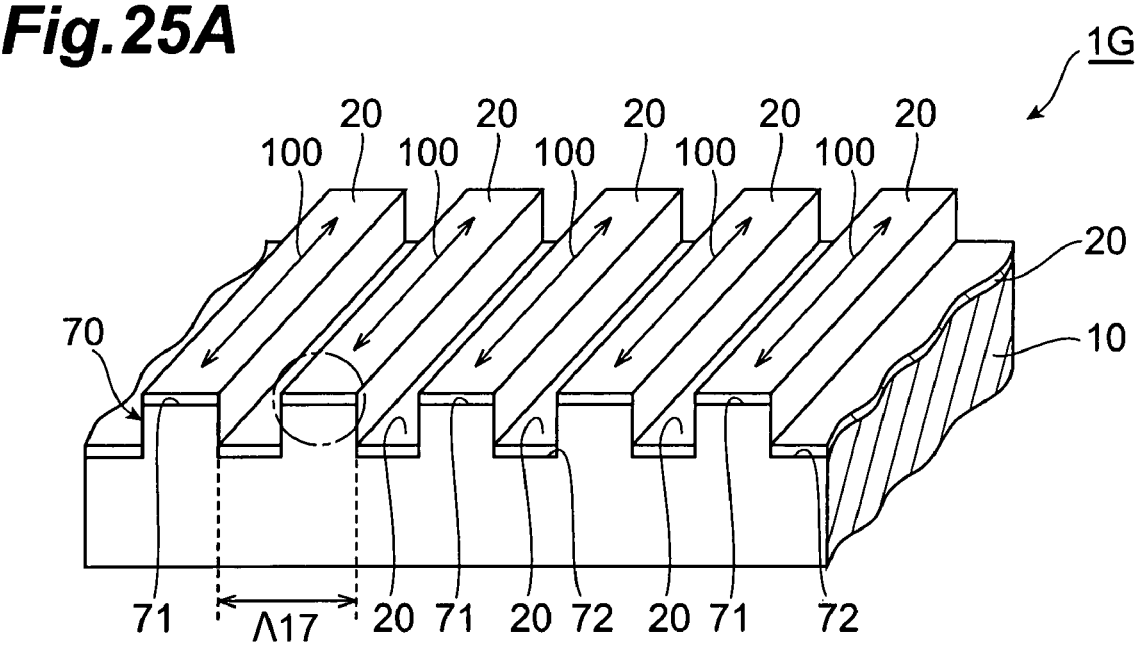
FIG. 25A shows a perspective view of an optical device, to which a modification example of a surface plasmon wave generating portion is applied.
Figure 25B:
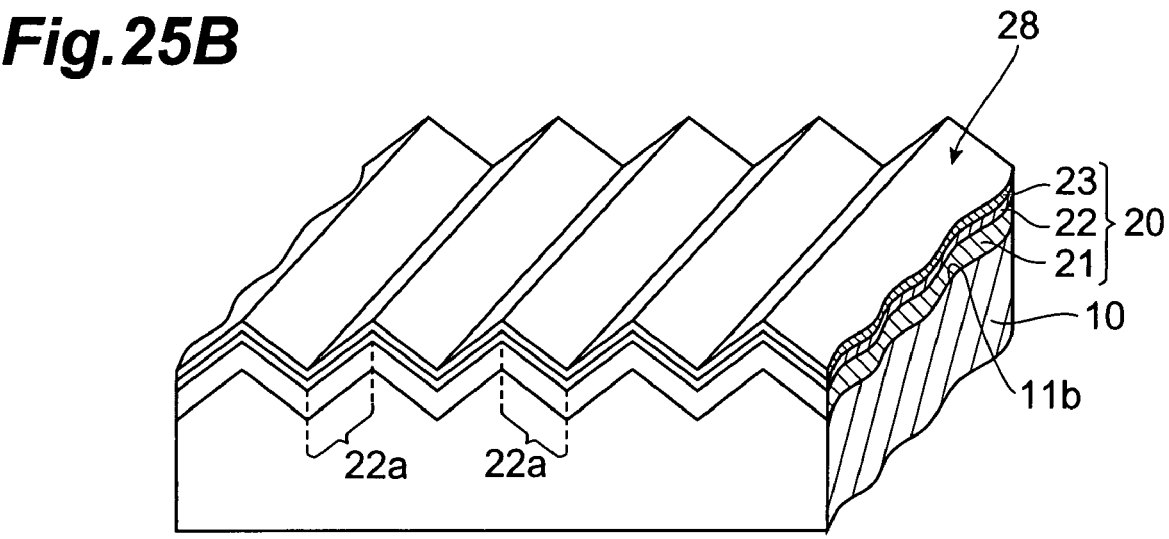
FIG. 25B shows a partially enlarged view of FIG. 25A.

FIG. 25A shows a perspective view of an optical device, to which a modification example of a surface plasmon wave generating portion is applied. FIG. 25B shows a partially enlarged view of FIG. 25A. A periodic uneven pattern 70 (surface plasmon wave generating portion) is formed on the top surface 11 of the semiconductor substrate of the optical device 1G. The uneven pattern 70 has substantially rectangular-wave-like shape, and a period $\Lambda 17$ thereof is determined so that surface plasmon waves (propagated in direction 100) are generated upon incidence of THz waves of a predetermined wavelength (for example, the wavelength $\lambda 1$). Thus with the optical device 1G, the uneven pattern 70 functions as a surface plasmon wave generating portion.

As shown in FIG. 25B, with the optical device 1G, waveguides 20, formed by laminating the clad layer 21, the quantum well layer 22, and the clad layer 23, are disposed on peak portions 71 and valley portions 72 of the uneven pattern 70. In each waveguide 20, an uneven pattern 28 is formed so that the quantum well layer 22 has intersecting regions 22a. FIG. 25B is an enlarged view of a region of FIG. 25A that is surrounded by alternate long and short dash lines.

As long as the uneven pattern 28 is formed so that the quantum well layer 22 has the intersecting regions 22a, the uneven pattern 28 is not restricted in shape and period and can be provided with the shape of any of the above-described first to eleventh modification examples. Also, it is sufficient that the quantum well layer 22 has, the intersecting region 22a and the uneven pattern 28 does not have to be periodic. In a case where the uneven pattern 28 is periodic, because the uneven pattern 28 is formed on each peak portion 71, the period of the uneven pattern 28 is smaller than the period $\Lambda 17$ of the uneven pattern 70.

With this arrangement, when THz waves of the wavelength $\lambda 1$ as the predetermined wavelength is made incident on the optical device 1G, surface plasmon waves (propagated in direction 100) are generated due to the uneven pattern 70. The generated surface plasmon waves (propagated in direction 100) propagate via the waveguides 20 with the intersecting regions 22a. In this case, by providing the aperture 24 in the direction of propagation of the surface plasmon waves (propagated in direction 100), the surface plasmon waves (propagated in direction 100) can be focused. Thus by providing the wave receiving portion 30 on the aperture 24, the optical device 1G can be used as a THz wave receiver. Also by disposing the THz wave generating portion 60 on the aperture 24, the optical device 1G can be used as a THz wave generating element.

The surface plasmon wave generating portion is not restricted to that which makes use of a grating. Surface plasmon waves can be generated by making use of total reflection or near-field light. A case of using total reflection shall now be described with reference to FIG. 26.

Figure 26:
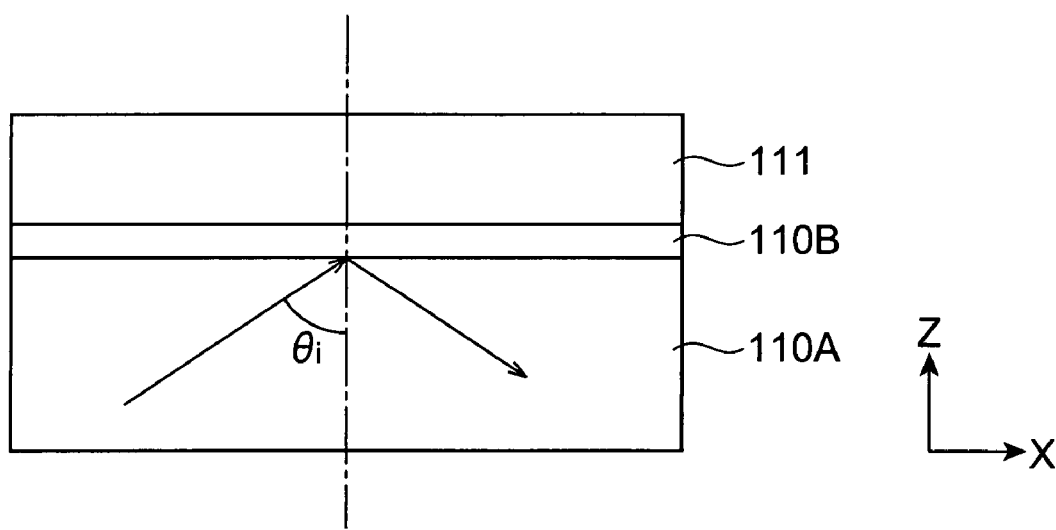
FIG. 26 is a diagram for describing principles of exciting surface plasmon waves by making use of total reflection.

A case where a dielectric 110A and a dielectric 110B, which differ in dielectric constant, and a conductive substance 111 are laminated in order as shown in FIG. 26 shall now be considered. It shall be deemed that the thickness of the dielectric 110B is thin so as to be close to the wavelength of light. It shall also be deemed that the dielectric constant $\epsilon_A$ of the dielectric 110A and the dielectric constant $\epsilon_B$ of the dielectric 110B satisfy the relationship: $\epsilon_A < \epsilon_B$.

When light propagating through the dielectric 110A is made incident on the dielectric 110B at an angle θi greater than a total reflection critical angle θc (θi>θc), a component kx, in the direction perpendicular (X-axis direction in FIG. 26) to the lamination direction (Z-axis direction in FIG. 26), of the wave number of light that is transmitted into the dielectric 110B is given by:

[Equation 4]

$$k_x = \frac{\omega}{c}\sqrt{\varepsilon_A}\sin\theta_i > \frac{\omega}{c}\sqrt{\varepsilon_A}\sin\theta_c = \frac{\omega}{c}\sqrt{\varepsilon_B} \quad (4)$$

In Equation (4), ω is an oscillation frequency of light to be converted to surface plasmon waves and c is the speed of light in vacuum.

From Equation (4), kx is larger, for example, than the wave number of light that propagates through the dielectric 110B upon being made incident at an incidence angle less than the critical angle θc. Thus if kx matches the wave number of a surface plasmon wave that can be generated at the interface of the conductive substance 111 and the dielectric 110B, the surface plasmon wave can be excited.

As described above, the waveguide 20 having the intersecting regions 22a is the conductive substance 111 that can excite surface plasmon waves with THz waves. Thus by laminating the dielectrics 110B and 110A onto the waveguide 20 and making THz waves incident from the dielectric 110A onto the dielectric 110B at a predetermined angle greater than the critical angle θc, surface plasmon waves can be excited. In this case, the interface of the waveguide 20 and the dielectric 110B laminated onto the waveguide 20 functions as a surface plasmon wave generating portion.

Also although in FIG. 26, the dielectrics 110A and 110B and the conductive substance 111 are laminated in that order, in a case where the thickness of the conductive substance 111 is made thin so as to be close to the wavelength of light, lamination in the order of: the dielectric 110A; the conductive substance 111; and the dielectric 110B; can also be considered. With this arrangement, surface plasmon waves can be excited in the interface of the conductive substance 111 and the dielectric 110B when the angle of incidence onto the conductive substance 111 from the dielectric 110A is greater than the critical angle. When the waveguide 20 having the intersecting regions 22a is deemed to be the conductive substance 111, the interface of the waveguide 20 and the dielectric 110B functions as the surface plasmon wave generating portion.

When for example, surface plasmon waves are to be generated at the interface of air and the waveguide 20 as in the optical device 1A or 1B, because the air corresponds to being the dielectric 110B and the waveguide 20 corresponds to being the conductive substance 111, the dielectric 110A is disposed between the waveguide 20 and the semiconductor substrate 10.

As was described using FIGS. 25A, 25B, and 26, when the surface plasmon wave generating portion is not an uneven pattern formed in the waveguide 20, the plurality of intersecting regions 22a of the waveguide 20 may simply be continuous or may be positioned discretely. By the plurality of intersecting regions 22a being continuous, surface plasmon waves can be made to propagate in the alignment direction of the plurality of intersecting regions 22a.

Also when surface plasmon waves are to be generated at the interface of the waveguide 20 and the semiconductor substrate 10 as in the optical device 1C, because the semiconductor substrate 10 corresponds to being the dielectric 110B and the waveguide 20 corresponds to being the conductive substance 111, the dielectric 110A is disposed between the waveguide 20 and the semiconductor layer 50. Or, the semiconductor layer 50, functioning as the dielectric 110A with respect to the waveguide 20, is laminated onto the waveguide 20.

In a case of using near-field light, for example, a knife edge or other object (diffracting object) that diffracts light is disposed close to the waveguide 20. In this case, when THz waves are made incident onto a gap between the diffracting object and the waveguide 20, diffracted light components (near-field light components) of various wave numbers are generated. If in this case the wave numbers included in the diffracted light include wave numbers of surface plasmon waves that are generated at the interface of the waveguide 20 and the dielectric (for example, air), surface plasmon waves are generated. Thus in the case of making use of near-field light, the diffracting object becomes the surface plasmon wave generating portion.

Figure 27:
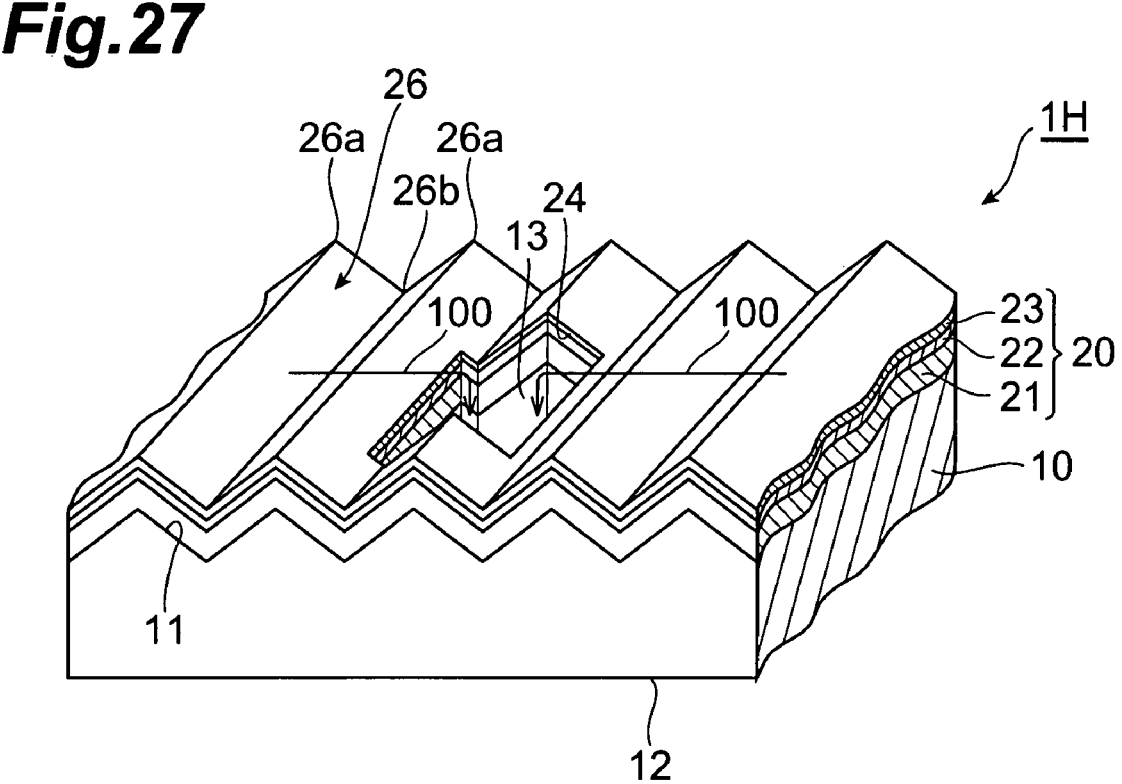
FIG. 27 is a perspective view of an optical device, in which a semiconductor substrate has a penetrating hole.

The optical device may also be of an arrangement having a penetrating hole 13 that is in communication with the aperture 24 of the waveguide 20 of the semiconductor substrate 10 as shown in FIG. 27. Here, the waveguide 20 of an optical device 1H has the uneven pattern 26 that is applied to the waveguide 20 of the optical device 1B. In this case, the surface plasmon waves (propagated in direction 100) generated by the incidence of the THz waves are focused to the aperture 24 as shown in FIG. 27. Because the aperture 24 is in communication with the penetrating hole 13, the energy due to the surface plasmon waves (propagated in direction 100) focused to the aperture 24 moves toward the rear surface 12 side of the semiconductor substrate 10 via the penetrating hole 13. Energy can thus be taken out from the rear surface 12 side of the semiconductor substrate 10.

Furthermore, each of the optical devices 1A, 1B, and 1D to 1F may be provided with the THz wave generating portion 60 in place of the wave receiving portion 30 and thereby arranged as a THz wave generating element. Yet furthermore, although each of the optical devices 1A to 1H is made to function as a THz wave receiver or a THz wave generating element by being provided with the wave receiving portion 30 or the THz wave generating portion 60, a wave receiving portion 30 or a THz wave generating portion 60 does not have to be disposed in particular on the aperture 24. In this case, the optical device functions, for example, as an optical filter or a spectroscopic device.

Furthermore, although an optical device is arranged by forming the aperture 24 in the waveguide 20 having the intersecting regions 22a, an arrangement, with which a quantum well structure, having the intersecting regions 22a, is formed on a semiconductor substrate, can, for example, be used a waveguide device that propagates surface plasmon waves.

Although the waveguide 20 is described as being constituted of the clad layer 21, the quantum well layer 22, and the clad layer 23, it is sufficient that the waveguide be constituted of the quantum well layer 22 and the clad layer 22 or the clad layer 23. Also, the uneven pattern is not restricted in particular as long as it is formed so that the quantum well layer 22 has an intersecting region that intersects the XY plane, such as the intersecting region 22a and the intersecting region 22b.

Also as the waveguide structure, it is sufficient that the quantum well layer 22 inside the quantum well structure has an intersecting region (such as the intersecting region 22a) that is a region that intersects the XY plane. Thus of the waveguide 20, a periodic structure portion (such as the periodic structure portion 25A), which is a portion having an uneven pattern (such as the uneven pattern 26), can be arranged in particular as the waveguide structure. In this case, the waveguide 20 is constituted of the periodic structure portion that functions as the waveguide structure (such as the periodic structure portion 25A) and the aperture 24 that functions as the focusing portion. Also, it is sufficient that the quantum well layer of the quantum well structure disposed on the semiconductor substrate has the abovedescribed intersecting region and there may be just one intersecting region. When there are a plurality of intersecting regions, these do not have to be continuous and may be disposed in a discrete manner as shown in FIGS. 24A to 24C.

Also, although the aperture 24, which is a penetrating hole formed in the waveguide 20, is arranged as the focusing portion for focusing the surface plasmon waves (propagated in direction 100), the focusing portion does not have to be penetrating hole. It is sufficient that the focusing portion be a region that does not satisfy conditions for propagation of surface plasmon waves, such as a region not having an intersecting region. From the standpoint of focusing the surface plasmon waves more reliably, the size (for example, the length in the X-axis direction in FIG. 1 or the diameter in FIG. 18) of the focusing portion is preferably smaller than the wavelength of the light that is to be converted into surface plasmon waves.

What is claimed is:

1. An optical device comprising:
   a semiconductor substrate; and
   a waveguide, disposed on the semiconductor substrate and having a waveguide structure that propagates surface plasmon waves, comprising:
      a quantum well structure, disposed on a semiconductor substrate; wherein
      the quantum well structure has a quantum well layer, in turn having an intersecting region that intersects a hypothetical plane substantially orthogonal to an alignment direction of the quantum well structure with respect to the semiconductor substrate, and
      a real part of a dielectric constant of the quantum well structure is negative for THz waves of a predetermined wavelength; wherein
   the waveguide has a focusing portion for focusing the surface plasmon waves, the focusing portion being disposed along a direction of propagation of the surface plasmon waves propagated by the waveguide structure.

2. The optical device according to claim 1, wherein the focusing portion is an aperture that penetrates through the waveguide in the alignment direction of the quantum well structure with respect to the semiconductor substrate.

3. The optical device according to claim 1, further comprising:
   a surface plasmon wave generating portion, making surface plasmon waves be generated according to incidence of the THz waves of the predetermined wavelength; wherein
   the waveguide structure propagates the surface plasmon waves generated at the surface plasmon wave generating portion.

4. The optical device according to claim 3, wherein the surface plasmon wave generating portion is a periodic uneven pattern formed in the quantum well structure provided in the waveguide structure.

5. The optical device according to claim 4, wherein the quantum well layer of the quantum well structure has a plurality of intersecting regions, and the plurality of intersecting regions are continuous in the form of the uneven pattern.

6. The optical device according to claim 3, wherein
   an uneven pattern is formed in the quantum well structure provided in the waveguide structure,
   the quantum well layer of the quantum well structure has a plurality of intersecting regions,
   the plurality of intersecting regions are continuous in the form of the uneven pattern,
   the uneven pattern includes a first uneven pattern, having a first period, and a second uneven pattern, having a second period and being positioned, with respect to the first uneven pattern, in a direction substantially orthogonal to the alignment direction,
   the first uneven pattern is the surface plasmon wave generating portion,
   the second uneven pattern is positioned at a side opposite the focusing portion with respect to the first uneven pattern, and
   the second period is half of the first period.

7. The optical device according to claim 3, wherein
   the surface plasmon wave generating portion is an uneven pattern, formed on a principal surface of the semiconductor substrate and causing the surface plasmon waves to be generated upon incidence of the THz waves of the predetermined wavelength, and
   the waveguide is disposed on the principal surface on which the uneven pattern is formed.

8. The optical device according to claim 1, wherein
   a wave receiving portion that detects either one of the surface plasmon waves propagating through the waveguide structure and THz waves, having the same oscillation frequency as the surface plasmon waves, is disposed on the focusing portion.

9. The optical device according to claim 8, having a plurality of focusing portions, wherein
   the wave receiving portion is disposed on each of the focusing portions.

10. The optical device according to claim 1, wherein
    a THz wave generating portion, generating the THz waves of the predetermined wavelength, is disposed on the focusing portion, and
    the surface plasmon wave generating portion generates the surface plasmon waves according to incidence of the THz waves of the predetermined wavelength generated by the THz wave generating portion.

11. The optical device according to claim 10, having a plurality of focusing portions wherein
    the THz wave generating portion is disposed on each of the focusing portions.

12. An optical device comprising:
    a semiconductor substrate; and
    a plurality of waveguides, disposed on the semiconductor substrate and each of the waveguides having the waveguide structure according to claim 1; wherein
    the plurality of waveguides are aligned in parallel in a direction substantially orthogonal to the alignment direction, and
    in each of the waveguides, a periodic uneven pattern, making surface plasmon waves be generated according to incidence of THz waves of a predetermined wavelength, is formed in the quantum well structure provided in the waveguide structure,
    the quantum well layer has a plurality of intersecting regions that are continuous in the form of the uneven pattern, a focusing portion, focusing the surface plasmon waves, is disposed along the direction of propagation of the surface plasmon waves propagated by the waveguide structure, and the periods of the uneven patterns in the waveguide structures of at least two of the waveguides, among the plurality of waveguides, differ.

13. The optical device according to claim 12, wherein a wave receiving portion that detects either one of the surface plasmon waves propagating through the waveguide structure and THz waves, having the same oscillation frequency as the surface plasmon waves, is disposed on the focusing portion of each of the waveguides.

14. The optical device according to claim 12, wherein on the focusing portion of each of the waveguides is disposed a THz generating portion that generates the THz waves of the predetermined wavelength that make the surface plasmon waves to be generated in the uneven pattern of each of the waveguides.

* * * * *